United States Patent
Gates et al.

(10) Patent No.: US 9,542,895 B2
(45) Date of Patent: Jan. 10, 2017

(54) ELECTRO-OPTIC DISPLAYS, AND METHODS FOR DRIVING SAME

(71) Applicant: E INK CORPORATION, Billerica, MA (US)

(72) Inventors: Holly G. Gates, Somerville, MA (US); Robert W. Zehner, Los Gatos, CA (US); Jonathan D. Albert, Philadelphia, PA (US)

(73) Assignee: E Ink Corporation, Billerica, MA (US)

(*) Notice: Subject to any disclaimer, the term of this patent is extended or adjusted under 35 U.S.C. 154(b) by 0 days.

(21) Appl. No.: 14/582,306

(22) Filed: Dec. 24, 2014

(65) Prior Publication Data

US 2015/0109283 A1   Apr. 23, 2015

Related U.S. Application Data

(62) Division of application No. 10/904,718, filed on Nov. 24, 2004, now Pat. No. 8,928,562.

(Continued)

(51) Int. Cl.
*G09G 5/00* (2006.01)
*G09G 3/34* (2006.01)
(Continued)

(52) U.S. Cl.
CPC .......... *G09G 3/344* (2013.01); *G02F 1/133305* (2013.01); *G02F 1/167* (2013.01);
(Continued)

(58) Field of Classification Search
CPC .............. G09G 3/344; G09G 2340/16; G09G 2330/021
(Continued)

(56) References Cited

U.S. PATENT DOCUMENTS 3,668,106 A    6/1972   Ota
3,756,693 A    9/1973   Ota
(Continued)

FOREIGN PATENT DOCUMENTS

DE    25 23 763       12/1976
EP    1 145 072 B1    5/2003
(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner* — Calvin C Ma
(74) *Attorney, Agent, or Firm* — Brian D. Bean

(57) ABSTRACT

An electro-optic display includes an electro-optic medium, a pixel electrode for applying an electric field to the medium and a column electrode associated with the pixel electrode. To reduce power consumption, when it is necessary to change the voltage on the column electrode from a first value to a second value to change the optical state of the electro-optic medium, the column electrode voltage is first changed to a third value intermediate the first and second values to permit charge to flow to or from the column electrode, and thereafter the column electrode voltage is changed from the third voltage to the second voltage.

6 Claims, 12 Drawing Sheets

Related U.S. Application Data

(60) Provisional application No. 60/525,023, filed on Nov. 25, 2003, provisional application No. 60/527,870, filed on Dec. 8, 2003, provisional application No. 60/527,888, filed on Dec. 8, 2003.

(51) Int. Cl.
*G02F 1/1333* (2006.01)
*G02F 1/167* (2006.01)
*G06F 3/14* (2006.01)

(52) U.S. Cl.
CPC ......... *G09G 3/3453* (2013.01); *G06F 3/1446* (2013.01); *G09G 2300/026* (2013.01); *G09G 2310/0275* (2013.01); *G09G 2320/041* (2013.01); *G09G 2330/021* (2013.01); *G09G 2340/16* (2013.01); *Y10T 29/4913* (2015.01)

(58) Field of Classification Search
USPC ............. 345/101, 107, 212, 1.1, 1.3; 29/832
See application file for complete search history.

(56) References Cited

U.S. PATENT DOCUMENTS

| | | | |
|---|---|---|---|
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 3,972,040 A | 7/1976 | Hilsum et al. | |
| 4,041,481 A | 8/1977 | Sato | |
| 4,418,346 A | 11/1983 | Batchelder | |
| 4,430,648 A | 2/1984 | Togashi et al. | |
| 4,450,440 A | 5/1984 | White | |
| 4,741,604 A | 5/1988 | Kornfeld | |
| 4,746,917 A | 5/1988 | DiSanto et al. | |
| 4,833,464 A | 5/1989 | DiSanto et al. | |
| 4,947,157 A | 8/1990 | DiSanto et al. | |
| 4,947,159 A | 8/1990 | DiSanto et al. | |
| 5,066,946 A | 11/1991 | DiSanto et al. | |
| 5,223,115 A | 6/1993 | DiSanto et al. | |
| 5,247,290 A | 9/1993 | DiSanto et al. | |
| 5,254,981 A | 10/1993 | DiSanto et al. | |
| 5,266,937 A | 11/1993 | DiSanto et al. | |
| 5,293,528 A | 3/1994 | DiSanto et al. | |
| 5,302,235 A | 4/1994 | DiSanto et al. | |
| 5,412,398 A | 5/1995 | DiSanto et al. | |
| 5,467,107 A | 11/1995 | DiSanto et al. | |
| 5,467,217 A | 11/1995 | Check, III | |
| 5,499,038 A | 3/1996 | DiSanto et al. | |
| 5,654,732 A | 8/1997 | Katakura | |
| 5,684,501 A | 11/1997 | Knapp et al. | |
| 5,689,282 A | 11/1997 | Wolfs et al. | |
| 5,717,515 A | 2/1998 | Sheridon | |
| 5,739,801 A | 4/1998 | Sheridon | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,852,426 A | 12/1998 | Erhart et al. | |
| 5,852,430 A * | 12/1998 | Endo ............................ 345/101 |
| 5,866,284 A | 2/1999 | Vincent | |
| 5,872,552 A | 2/1999 | Gordon, II et al. | |
| 5,892,504 A | 4/1999 | Knapp | |
| 5,896,117 A | 4/1999 | Moon | |
| 5,930,026 A | 7/1999 | Jacobson et al. | |
| 5,933,203 A | 8/1999 | Wu et al. | |
| 5,961,804 A | 10/1999 | Jacobson et al. | |
| 5,963,456 A | 10/1999 | Klein et al. | |
| 5,978,052 A | 11/1999 | Ilcisin et al. | |
| 6,002,384 A | 12/1999 | Tamai et al. | |
| 6,017,584 A | 1/2000 | Albert et al. | |
| 6,034,807 A | 3/2000 | Little et al. | |
| 6,054,071 A | 4/2000 | Mikkelsen, Jr. | |
| 6,055,091 A | 4/2000 | Sheridon et al. | |
| 6,055,180 A | 4/2000 | Gudesen et al. | |
| 6,057,814 A | 5/2000 | Kalt | |
| 6,064,410 A | 5/2000 | Wen et al. | |
| 6,067,185 A | 5/2000 | Albert et al. | |
| 6,081,285 A | 6/2000 | Wen et al. | |
| 6,097,531 A | 8/2000 | Sheridon | |
| 6,118,426 A * | 9/2000 | Albert ........................ B41J 2/01 315/150 |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,154,190 A | 11/2000 | Yang et al. | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,211,998 B1 | 4/2001 | Sheridon | |
| 6,225,971 B1 | 5/2001 | Gordon, II et al. | |
| 6,232,950 B1 | 5/2001 | Albert et al. | |
| 6,236,385 B1 | 5/2001 | Nomura et al. | |
| 6,239,896 B1 | 5/2001 | Ikeda | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,816 B1 | 8/2001 | Jeong et al. | |
| 6,271,823 B1 | 8/2001 | Gordon, II et al. | |
| 6,274,508 B1 * | 8/2001 | Jacobsen et al. ............. 438/758 |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,320,565 B1 | 11/2001 | Albu et al. | |
| 6,323,989 B1 | 11/2001 | Jacobson et al. | |
| 6,327,072 B1 | 12/2001 | Comiskey et al. | |
| 6,330,054 B1 | 12/2001 | Ikami | |
| 6,348,908 B1 | 2/2002 | Richley et al. | |
| 6,359,605 B1 | 3/2002 | Knapp et al. | |
| 6,373,461 B1 | 4/2002 | Hasegawa et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,407,763 B1 | 6/2002 | Yamaguchi et al. | |
| 6,413,790 B1 | 7/2002 | Duthaler et al. | |
| 6,421,033 B1 | 7/2002 | Williams et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,462,837 B1 | 10/2002 | Tone | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,642,916 B1 | 11/2003 | Kodama et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |

(56) References Cited

U.S. PATENT DOCUMENTS

| | | | |
|---|---|---|---|
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Morrison et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,774,883 B1* | 8/2004 | Muhlemann | 345/101 |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Pratt et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,661 B2 | 3/2005 | Pullen et al. | |
| 6,885,495 B2* | 4/2005 | Liang et al. | 359/296 |
| 6,888,587 B2 | 5/2005 | Deane | |
| 6,930,818 B1* | 8/2005 | Liang et al. | 359/296 |
| 6,972,732 B1 | 12/2005 | Nishikawa | |
| 7,176,040 B2* | 2/2007 | Sirringhaus et al. | 438/6 |
| 7,332,381 B2 | 2/2008 | Maruyama et al. | |
| 2001/0026260 A1 | 10/2001 | Yoneda et al. | |
| 2001/0040569 A1 | 11/2001 | Liang | |
| 2002/0005832 A1 | 1/2002 | Katase | |
| 2002/0033784 A1 | 3/2002 | Machida et al. | |
| 2002/0033793 A1 | 3/2002 | Machida et al. | |
| 2002/0060321 A1 | 5/2002 | Kazlas et al. | |
| 2002/0063661 A1 | 5/2002 | Comiskey et al. | |
| 2002/0090980 A1 | 7/2002 | Wilcox et al. | |
| 2002/0113770 A1 | 8/2002 | Jacobson et al. | |
| 2002/0118156 A1 | 8/2002 | Naito | |
| 2002/0130832 A1 | 9/2002 | Baucom et al. | |
| 2002/0180687 A1 | 12/2002 | Webber | |
| 2002/0182544 A1* | 12/2002 | Chan-Park | G02F 1/167 430/311 |
| 2002/0196207 A1 | 12/2002 | Machida et al. | |
| 2002/0196219 A1 | 12/2002 | Matsunaga et al. | |
| 2003/0011560 A1 | 1/2003 | Albert et al. | |
| 2003/0020844 A1 | 1/2003 | Albert et al. | |
| 2003/0038772 A1 | 2/2003 | deBoer et al. | |
| 2003/0058223 A1 | 3/2003 | Tracy et al. | |
| 2003/0063076 A1 | 4/2003 | Machida et al. | |
| 2003/0102858 A1 | 6/2003 | Jacobson et al. | |
| 2003/0132908 A1 | 7/2003 | Herb et al. | |
| 2003/0137521 A1 | 7/2003 | Zehner et al. | |
| 2003/0151702 A1 | 8/2003 | Morrison et al. | |
| 2003/0214695 A1 | 11/2003 | Abramson et al. | |
| 2003/0222315 A1 | 12/2003 | Amundson et al. | |
| 2004/0012839 A1 | 1/2004 | Cao et al. | |
| 2004/0014265 A1 | 1/2004 | Kazlas et al. | |
| 2004/0027327 A1 | 2/2004 | LeCain et al. | |
| 2004/0051934 A1 | 3/2004 | Machida et al. | |
| 2004/0075634 A1 | 4/2004 | Gates | |
| 2004/0094422 A1 | 5/2004 | Pullen et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0120024 A1 | 6/2004 | Chen et al. | |
| 2004/0136048 A1 | 7/2004 | Arango et al. | |
| 2004/0145561 A1 | 7/2004 | Ikeda | |
| 2004/0155857 A1 | 8/2004 | Duthaler et al. | |
| 2004/0180476 A1 | 9/2004 | Kazlas et al. | |
| 2004/0190114 A1 | 9/2004 | Jacobson et al. | |
| 2004/0190115 A1 | 9/2004 | Liang et al. | |
| 2004/0196215 A1 | 10/2004 | Duthaler et al. | |
| 2004/0226820 A1 | 11/2004 | Webber et al. | |
| 2004/0233509 A1 | 11/2004 | Zhang et al. | |
| 2004/0239614 A1 | 12/2004 | Amundson et al. | |
| 2004/0246562 A1 | 12/2004 | Chung et al. | |
| 2004/0252360 A1 | 12/2004 | Webber et al. | |
| 2004/0257635 A1 | 12/2004 | Paolini, Jr. et al. | |
| 2004/0263947 A1 | 12/2004 | Drzaic et al. | |
| 2005/0000813 A1 | 1/2005 | Pullen et al. | |
| 2005/0001810 A1 | 1/2005 | Yakushiji et al. | |
| 2005/0001812 A1 | 1/2005 | Amundson et al. | |
| 2005/0007336 A1 | 1/2005 | Albert et al. | |
| 2005/0007653 A1 | 1/2005 | Honeyman et al. | |
| 2005/0012980 A1 | 1/2005 | Wilcox et al. | |
| 2005/0017944 A1 | 1/2005 | Albert | |
| 2005/0018273 A1 | 1/2005 | Honeyman et al. | |
| 2005/0024353 A1 | 2/2005 | Amundson et al. | |
| 2005/0035941 A1 | 2/2005 | Albert et al. | |
| 2005/0041004 A1 | 2/2005 | Gates et al. | |
| 2005/0062714 A1 | 3/2005 | Zehner et al. | |
| 2005/0067656 A1 | 3/2005 | Denis et al. | |
| 2005/0078099 A1 | 4/2005 | Amundson et al. | |
| 2006/0139304 A1 | 6/2006 | Goden | |

FOREIGN PATENT DOCUMENTS

| | | |
|---|---|---|
| EP | 1 462 847 | 9/2004 |
| EP | 1 482 354 A1 | 12/2004 |
| EP | 1 484 635 | 12/2004 |
| EP | 1 500 971 A1 | 1/2005 |
| EP | 1 501 194 A1 | 1/2005 |
| JP | 62-229221 | 10/1987 |
| JP | 03-091722 A | 4/1991 |
| JP | 03-096925 A | 4/1991 |
| JP | 05-173194 A | 7/1993 |
| JP | 06-233131 A | 8/1994 |
| JP | 09-016116 A | 1/1997 |
| JP | 09-185087 A | 7/1997 |
| JP | 09-230391 A | 9/1997 |
| JP | 11-113019 A | 4/1999 |
| JP | 2000-221546 | 8/2000 |
| JP | 2000-321597 | 11/2000 |
| JP | 2003-190764 | 7/2003 |
| WO | WO 99/10870 | 3/1999 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 01/54108 | 7/2001 |
| WO | WO 03/079324 | 9/2003 |
| WO | WO 03/107315 | 12/2003 |
| WO | WO 2004/001498 | 12/2003 |
| WO | WO 2004/006006 | 1/2004 |
| WO | WO 2004/008239 | 1/2004 |
| WO | WO 2004/055586 | 7/2004 |
| WO | WO 2004/059379 | 7/2004 |
| WO | WO 2004/077140 | 9/2004 |
| WO | WO 2004/079442 | 9/2004 |
| WO | WO 2004/090626 | 10/2004 |
| WO | WO 2004/107031 | 12/2004 |

OTHER PUBLICATIONS

Antia, M., "Switchable Reflections Make Electronic Ink", Science, 285, 658 (1999).

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

(56) References Cited

OTHER PUBLICATIONS

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Hayes, R.A., et al., "Video-Speed Electronic Paper Based on Electrowetting", Nature, vol. 425, Sep. 25, pp. 383-385 (2003).

Hunt, R.W.G., "Measuring Color", 3d. Edn, Fountain Press (ISBN 0 86343 387 1), p. 63 (1998).

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

Mossman, M.A., et al., "A New Reflective Color Display Technique Based on Total Internal Reflection and Substractive Color Filtering", SID 01 Digest, 1054 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Poor, A., "Feed forward makes LCDs Faster", available at "http://www.extremetech.com/article2/0,3973,10085,00.asp".

Shiffman, R.R., et al., "An Electrophoretic Image Display with Internal NMOS Address Logic and Display Drivers," Proceedings of the SID, 1984, vol. 25, 105 (1984).

Singer, B., et al., "An X-Y Addressable Electrophoretic Display," Proceedings of the SID, 18, 255 (1977).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

International Search Report and Written Opinion of PCT/US04/39863 (2006).

\* cited by examiner

ELECTRO-OPTIC DISPLAYS, AND METHODS FOR DRIVING SAME

REFERENCE TO RELATED APPLICATIONS

This application is a division of application Ser. No. 10/904,718, filed Nov. 24, 2004 (Publication No. 2005/0122284), which claims benefit of Application Ser. No. 60/525,023, filed Nov. 25, 2003, and of Application Ser. Nos. 60/527,870 and 60/527,888, both filed Dec. 8, 2003.

This application is related to application Ser. No. 10/879,335, filed Jun. 29, 2004 (Publication No. 2005/0024353), which itself is a continuation-in-part of application Ser. No. 10/814,205, filed Mar. 31, 2004 (now U.S. Pat. No. 7,119,772), which itself is a continuation-in-part of application Ser. No. 10/065,795, filed Nov. 20, 2002 (Publication No. 2003/0137521, now U.S. Pat. No. 7,012,600). The aforementioned application Ser. No. 10/879,335 claims benefit of Application Ser. No. 60/481,040, filed Jun. 30, 2003, of Application Ser. No. 60/481,053, filed Jul. 2, 2003, and of Application Ser. No. 60/481,405, filed Sep. 22, 2003. The aforementioned application Ser. No. 10/814,205 claims benefit of Application Ser. No. 60/320,070, filed Mar. 31, 2003, of Application Ser. No. 60/320,207, filed May 5, 2003, of Application Ser. No. 60/481,669, filed Nov. 19, 2003, of Application Ser. No. 60/481,675, filed Nov. 20, 2003 and of Application Ser. No. 60/557,094, filed Mar. 26, 2004. The aforementioned application Ser. No. 10/065,795 claims benefit of Application Ser. No. 60/319,007, filed Nov. 20, 2001, of Application Ser. No. 60/319,010, filed Nov. 21, 2001, of Application Ser. No. 60/319,034, filed Dec. 18, 2001, of Application Ser. No. 60/319,037, filed Dec. 20, 2001, and of Application Ser. No. 60/319,040, filed Dec. 21, 2001.

This application is related to application Ser. No. 10/249,973, filed May 23, 2003 (now U.S. Pat. No. 7,193,625), which is a continuation-in-part of the aforementioned application Ser. No. 10/065,795. Application Ser. No. 10/249,973 also claims benefit of Application Ser. No. 60/319,315, filed Jun. 13, 2002 and of Application Ser. No. 60/319,321, filed Jun. 18, 2002.

The entire contents of the aforementioned applications are herein incorporated by reference. The entire contents of all United States patents and published and Applications mentioned below are also herein incorporated by reference.

BACKGROUND OF INVENTION

This invention relates to electro-optic displays and to methods for driving such displays. More specifically, this invention relates to large area electro-optic displays, drivers for use with such large area displays, and a drive scheme and controller intended to reduce power consumption in active-matrix electro-optic displays. The present invention is especially, though not exclusively, intended for use in electrophoretic displays.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

In the displays of the present invention, the electro-optic medium will typically be a solid (such displays may hereinafter for convenience be referred to as "solid electro-optic displays"), in the sense that the electro-optic medium has solid external surfaces, although the medium may, and often does, have internal liquid- or gas-filled spaces. Thus, the term "solid electro-optic displays" includes encapsulated electrophoretic displays, encapsulated liquid crystal displays, and other types of displays discussed below.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning in the imaging art of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also European Patent Applications 1,429,178; 1,462,847; 1,482,354; and 1,484,625; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; and 6,822,782; and U.S. Patent Applications Publication Nos. 2002/0019081; 2002/0060321; 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0053189; 2003/0102858; 2003/0132908; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; and 2004/0119681; and International Applications Publication Nos. WO 99/67678; WO 00/05704; WO 00/38000; WO 00/38001; WO00/36560; WO 00/67110; WO 00/67327; WO 01/07961; WO 01/08241; WO 03/107,315; WO 2004/023195; WO 2004/049045; WO 2004/059378; WO 2004/088002; WO 2004/088395; and WO 2004/090857.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in an article in the Sep. 25, 2003 issue of the Journal "Nature" and entitled "Performing Pixels: Moving Images on Electronic Paper". It is shown in application Ser. No. 10/711,802, filed Oct. 6, 2004, that such electro-wetting displays can be made bistable Other types of electro-optic materials may also be used in the present invention. Of particular interest, bistable ferro-electric liquid crystal displays (FLC's) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Also, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

As already noted, and as discussed in detail in the aforementioned 2003/0137521 and in application Ser. No. 10/814,205, filed Mar. 31, 2004 and Ser. No. 10/879,335, filed Jun. 29, 2004 (see also the corresponding International Applications WO 2004/090857 and PCT/US2004/21000 respectively), bistable electro-optic displays act, to a first approximation, as impulse transducers, so that the final state of a pixel depends not only upon the electric field applied and the time for which this field is applied, but also upon the state of the pixel prior to the application of the electric field. Furthermore, it has now been found, at least in the case of many particle-based electro-optic displays, that the impulses necessary to change a given pixel through equal changes in gray level (as judged by eye or by standard optical instruments) are not necessarily constant, nor are they necessarily commutative. For example, consider a display in which each pixel can display gray levels of 0 (white), 1, 2 or 3 (black), beneficially spaced apart. (The spacing between the levels may be linear in percentage reflectance, as measured by eye or by instruments but other spacings may also be used. For example, the spacings may be linear in L* (where L* has the usual CIE definition:

$$L^* = 116(R/R_0)^{1/3} - 16,$$

where R is the reflectance and $R_0$ is a standard reflectance value), or may be selected to provide a specific gamma; a gamma of 2.2 is often adopted for monitors, and where the present displays are be used as a replacement for a monitor, use of a similar gamma may be desirable.) It has been found that the impulse necessary to change the pixel from level 0 to level 1 (hereinafter for convenience referred to as a "0-1 transition") is often not the same as that required for a 1-2 or 2-3 transition. Furthermore, the impulse needed for a 1-0 transition is not necessarily the same as the reverse of a 0-1 transition. In addition, some systems appear to display a "memory" effect, such that the impulse needed for (say) a 0-1 transition varies somewhat depending upon whether a particular pixel undergoes 0-0-1, 1-0-1 or 3-0-1 transitions (where, the notation "x-y-z", where x, y, and z are all optical states 0, 1, 2, or 3 denotes a sequence of optical states visited sequentially in time, list from earlier to later). Although these problems can be reduced or overcome by driving all pixels of the display to one of the extreme states for a substantial period before driving the required pixels to other states, the resultant "flash" of solid color is often unacceptable; for example, a reader of an electronic book may desire the text of the book to scroll down the screen, and may be distracted, or lose his place, if the display is required to flash solid black or white at frequent intervals. Furthermore, such flashing of the display increases its energy consumption and may reduce the working lifetime of the display. Finally, it has been found that, at least in some cases, the impulse required for a particular transition is affected by the temperature and the total operating time of the display, and by the time that a specific pixel has remained in a particular optical state prior to a given transition, and that compensating for these factors is desirable to secure accurate gray scale rendition. Hence, methods of controlling and applying well-defined impulses to an electro-optic medium are required to produce good image rendition in electro-optic displays.

When an active matrix electro-optic display is being rewritten (i.e., when a new image is being placed upon the display, or an image is being refreshed), the charging and discharging of the column electrodes can be a significant source of power consumption. (The charging and discharging of the row electrodes also consumes some power, but the power consumption of the row electrodes is much lower, since any given row electrode is charged and discharged only one during the period used for writing the whole display, whereas a column electrode may have to be charged and discharged every time a new row of the display is to be rewritten, and typically an active matrix display may be have several hundred rows.) The worst case scenario for such column electrode power consumption occurs when stripes or checkers in a displayed image are being inverted; in this case, every column line is switched across its full voltage range (i.e., to support white-to-black or black-to-white pixel optical state changes) as every line of the display is being written. In this situation the capacitive power used to charge and discharge the column electrodes is given by:

$$P = \tfrac{1}{2} fCV^2 \qquad (A)$$

where P is the power consumed during display scanning, C is the combined capacitance of all column electrodes being switched, V is the full "swing voltage" (i.e., the full voltage operating range) of the column drivers, and f is the effective frequency of the waveform seen at the column electrodes.

In displays that use relatively high voltages, such as some electro-optic displays, the majority of the power consumed by the display can arise from this source. In one aspect, the present invention seeks to provide a method for driving an active matrix electro-optic display which reduces the power consumption due to switching of the column electrodes. This invention also provides modified drivers for use in carrying out this method; these drivers can be designed to decrease both average and peak power consumption.

As already mentioned, a second aspect of the present invention relates to large area electro-optic displays, and drivers for use with such large area displays. Specifically, this aspect of the invention relates to display drivers with integrated controller logic for driving such large area electro-optic displays.

Traditionally, electronic (including electro-optic) displays are rigid devices that include components mounted to a rigid support structure. To manufacture a large area display, multiple rigid display subsystems have been combined by attaching the subsystems to a rigid frame. Such a large area display can be heavy and expensive, and can be significantly limited in its scalability to larger sizes. The present invention seeks to provide a flexible large area electro-optic display which can be manufactured from relatively inexpensive materials and sub-components using low cost processes, including printing and laminating steps.

Thus, large area signs including electro-optic displays can be made having a number of advantages over similar traditional displays. Such advantages may include light weight, lower power consumption, visibility under a variety of lighting conditions, scalability, and improved large area manufacturing capabilities. Such signs are effectively maintenance-free and weatherproof and can be used both indoors and outdoors. Thus, large area signs using electro-optic displays are particularly desirable in a wide range of commercial and non-commercial applications.

However, one of the challenges in the construction of such large-area signs is the design of the drive electronics. As explained above, the drive requirements of electro-optic media typically render known drivers designed for driving liquid crystal displays unsuitable for use in driving bistable electro-optic displays without custom modification.

Circuit drivers specifically designed for driving an electro-optic display is described in the aforementioned 2003/0137521, Ser. Nos. 10/814,205 and 10/879,335. These drivers are, however, optimized for driving the data lines of an active matrix display, and hence do not include external logic, and are equipped with a shift register that does not cascade from driver to driver. This means that in a large-area or long sign using this driver, the controller must sequentially load in two bits per display pixel for every pixel in a given row before the display can be updated. Such data loading may take a significant amount of time. Also, because data is typically transmitted at a relatively high frequency, the data path may be unnecessarily fragile, potentially resulting in data corruption.

The present invention seeks to provide a driver that addresses the disadvantages of known drivers for large-area signs including electro-optic displays. Specifically, the present invention seeks to provide a driver which permits passing character data to a large number of display drivers at a relatively low bandwidth, thereby reducing power consumption and decreasing the probability of data corruption. The present invention also seeks to reduce the amount of electromagnetic interference emanating from the display through the use of low-voltage data interfaces, and to provide a driver that is compatible with existing character display modules, thus allowing displays to include a heterogeneous mix of display drivers on the same sign. Finally, the present invention seeks to provide improved integration between controller functionality and the electro-optic medium whereby each display module would, in effect, have its own controller, thus allowing individual modules to be replaced by for newer models, potentially with dramatically different properties, without affecting the operation of the remaining components of the sign.

SUMMARY OF INVENTION

In one aspect, this invention provides a method of driving an electro-optic display having an electro-optic medium, a pixel electrode capable of applying an electric field to the electro-optic medium, and a column electrode associated with the pixel electrode, the method comprising changing the voltage on the column electrode from a first value to a second value different from the first value, thereby causing the pixel electrode to cause a change in optical state of the electro-optic medium, wherein the voltage on the column electrode is first changed from the first value to a third value intermediate the first and second values for a period sufficient to permit charge to flow to or from the column electrode, and thereafter the voltage on the column electrode is changed from the third voltage to the second voltage.

This aspect of the present invention may hereinafter for convenience be referred to as the "two-step voltage change method" ("TSVCM") of the present invention, although it should be understood that this method is not limited to the use of only two steps, but could be practiced with more than two steps using more than one intermediate voltage between the first and second voltages.

In the two-step voltage change method of the invention, the first and second voltages may be of opposite polarity and the third voltage may be a ground voltage. The third voltage may be substantially equal to the arithmetic average of the first and second voltages. When, as is typically the case in active matrix displays, the display comprises a front electrode disposed on the opposite side of the electro-optic medium from the pixel electrode, the front electrode being held at a substantially constant voltage, the third voltage may be equal, or at least substantially equal, to the voltage on the front electrode. Also, when, as is typically the case, the display comprises a column driver connected to the column electrode and arranged to apply the first, second and third voltages thereto, and voltage supply means arranged to supply at least two voltages to the column driver, the TSVCM may be effected so that the charge, flowing to or from the column electrode when the voltage on the common electrode is set to the third value, does not pass through the voltage supply means.

As is well-known to those skilled in the technology of electro-optic displays, such displays commonly use a column driver connected to the column electrode, this column electrode having an "output enable" ("OE") input having on and off states, such that when the OE input is in its on state, the column driver can apply at least three different voltages to the column electrode, but when the OE input is in its off state, the column driver can apply only a single voltage (normally the voltage of a common front electrode) to the column electrode. When the TSVCM of the present invention is used with such a display the method may be effected by first setting the OE input to the off state, thereby causing the column driver to apply the third voltage to the column electrode, and thereafter setting the OE input to its on state, thereby causing the column driver to apply the second voltage to the column electrode. Also, as discussed in more detail below, in practice it is desirable that the TSVCM include the step of comparing an initial state of the column electrode to a desired final state thereof, and set the OE input to its off state only if the two states of the column electrode are different. More specifically, if the electro-optic display is of the conventional type comprising a plurality of column electrodes and a plurality of pixel electrodes such that each pixel electrode is connected to one column electrode, in the TSVCM, when an image on the display is being rewritten, the initial voltage on each column electrode during one step of the rewriting process may be compared with the final voltage on the column electrode during a subsequent step of the rewriting process, and the third voltage is applied only to the column electrodes for which the initial and final voltages differ.

The TSVCM may be applied to any type of electro-optic display, including for example a so-called "direct drive"

display as described in several of the aforementioned E Ink and MIT patents and applications, in which each pixel electrode is provided with a separate conductive trace ("column electrode") by which the voltage on the pixel electrode can be controlled. The TSVCM may also be used with passive matrix addressed displays. However, the TSVCM is especially intended for use with an active matrix display having a two-dimensional array of pixel electrodes on one side of the electro-optic medium and a common electrode on the opposed side of the electro-optic medium, a plurality of column electrodes connected to columns of the two-dimensional array of pixel electrodes and a plurality of row electrodes connected rows of the two-dimensional array of pixel electrodes, such that each pixel electrode is uniquely defined by the intersection of one specific column electrode and one specific row electrode.

The TSVCM may be used with any type of electro-optic medium, including any of those mentioned above. Thus, for example, the electro-optic medium may be a rotating bichromal member or electrochromic medium, or a particle-based electrophoretic medium comprising a suspending fluid and a plurality of electrically charged particles held in the suspending fluid and capable of moving therethrough on application of an electric field to the suspending fluid. The suspending fluid may be liquid or gaseous. The electrophoretic medium may be an encapsulated medium having a continuous phase which separates the suspending fluid and the electrically charged particles into a plurality of discrete droplets (perhaps better referred to as "voids" when the suspending fluid is gaseous).

This invention also provides an apparatus intended for use in the two-step voltage control method of the invention. Thus, this invention provides apparatus for driving an electro-optic display having an electro-optic medium, a pixel electrode capable of applying an electric field and a column electrode associated with the pixel electrode, the apparatus comprising:
 a column driver capable of applying at least first, second and third voltages to the column electrode, the first and second voltage differing from each other and the third voltage being intermediate the first and second voltages; and
 logic means arranged to determine when the column needs to change the voltage applied to the column electrode from the first voltage to the second voltage, and, when the need for such a change is detected, to cause the column driver to first apply the third voltage to the column electrode for a period sufficient to permit charge to flow to or from the column electrode, and thereafter to case the column driver to apply the second voltage to the column electrode.

In another aspect, this invention provides an electro-optic display system comprising a flexible substrate and a plurality of flexible electro-optic display units attached to the flexible substrate.

This aspect of the present invention, which is primarily although not exclusively intended for use in large areas displays, may hereinafter for convenience be referred to as the "flexible large area display" ("FLAD") of the present invention. Such a flexible large area display may further comprise an adhesive layer securing the plurality of display units to the flexible substrate. Typically, the flexible substrate will be light-transmissive (effectively transparent, although the presence of some color is not excluded, for example for color correction of a display or anti-reflection or anti-glare purposes). The display units may make use of any known display medium including the various types of electro-optic media discussed above, liquid crystal media (including polymer dispersed and plastic-based liquid crystal media), electroluminescent media and organic light emitting diodes. The flexible substrate may be provided with any known filter or surface treatment characteristics; for example, the flexible substrate may have an ultra-violet filtering property, or an anti-glare surface treatment.

In the FLAD of the present invention, the display units will typically be oriented for viewing through the flexible substrate. The FLAD may be provided with a mask adjacent to the substrate and effective to hide a non-active portion of the display units. The mask may have a color substantially matched to the or a color of the display units. When present, the adhesive layer typically is substantially clear. The adhesive layer may comprise, for example, at least one of ethylene vinyl acetate, polyvinyl butyrate, a thermoset material, a thermoplastic material, and a radiation curable material. The adhesive layer may be in sheet form, or may comprise a liquid.

The FLAD may also comprise a protective film and a second adhesive layer between the protective film and the flexible substrate. The protective layer may be thermoformable and/or may comprise a substantially clear plastic sheet. The flexible substrate may comprise at least one of polyester, acrylic, polycarbonate, polycarbonate-PVF composites, and clear fluoropolymers. The FLAD may comprise mounting blocks embedded in the adhesive layer (when present). In the FLAD, the display units may be overlapped at their edges.

This invention also provides a process for producing an electro-optic display system, the process comprising providing a flexible substrate, providing a plurality of flexible electro-optic display units and affixing the plurality of flexible electro-optic display units to the flexible substrate.

In this "FLAD process" the display units will typically be affixed to the flexible substrate by lamination. Such lamination may be vacuum lamination, and may be carried out with heating. The lamination may also be roll-to-roll lamination. The lamination may be carried out using a hot melt adhesive comprising at least one of ethylene vinyl-acetate, polyamide, polyurethane, and/or be effected by applying a liquid adhesive comprising at least one of silicone, epoxy, and polyurethane.

In another aspect, this invention provides a display module driver device for controlling an image to be displayed upon a display module comprising a plurality of pixels each having a pixel electrode associated therewith, the driver device comprising:
 input means for receiving data representing an initial and a final image to be displayed;
 translation means for translating the data received by the input means into pixel-wise representations of the initial and final images;
 storage means for storing the pixel-wise representations of the initial and final images;
 a plurality of output means arranged to control voltages to be applied to the pixel electrodes of the display; and
 logic means arranged to receive data from the storage means and to generate from this data the outputs required on the plurality of output means.

In this display module driver device ("DMDD") of the present invention, the logic means may arranged to vary the outputs in the output means in dependence upon at least one of an environmental parameter, a parameter representative of the operating life of the display module and a parameter representative of an electro-optic characteristic of the display module.

The DMDD is primarily intended for use with electro-optic displays, including any of the types of electro-optic media discussed above. The DMDD may be particularly useful in displays of the direct drive type mentioned above, which are divided into a series of pixels each of which is provided with a separate electrode, the display further comprising switching means arranged to control independently the voltage applied to each separate electrode. The DMDD may also be useful for in large-area direct-driven matrix displays where the overall cost of providing driver connections for every pixel is relatively small compared to other costs, such as the costs of the electro-optic medium.

This invention also provides a display assembly (the "DMDD assembly" of the present invention) comprising a plurality of display modules each of which has a display module driver device of the present invention associated therewith and arranged to control the image displayed on its associated display module, and display assembly input means arranged to receive image data representing images to be displayed on the display assembly and to provide at least part of the image data to each display module driver device.

In such a DMDD assembly, distributing the image data among the various DMDD's may be effected in any known manner, preferred methods for such data distribution being described in detail below. Typically, the DMDD's are "daisy-chained" with each DMDD having a data output means (separate from the output means which controls the voltages on the pixel) connected to the input means of the next DMDD in the chain.

The DMDD of the present invention may be arranged to carry out any of the driving methods described in the aforementioned the aforementioned 2003/0137521, Ser. Nos. 10/814,205 and 10/879,335, including the various optional aspects of such driving methods, such as correcting for temperature, relative humidity, operating lifetime of the electro-optic medium, etc. Accordingly, the DMDD may incorporate additional electronic devices or sensors required for such driving methods, for example a temperature or humidity sensor, or a timer measuring the operating time of the associated electro-optic display module.

DETAILED DESCRIPTION

Figure 1:
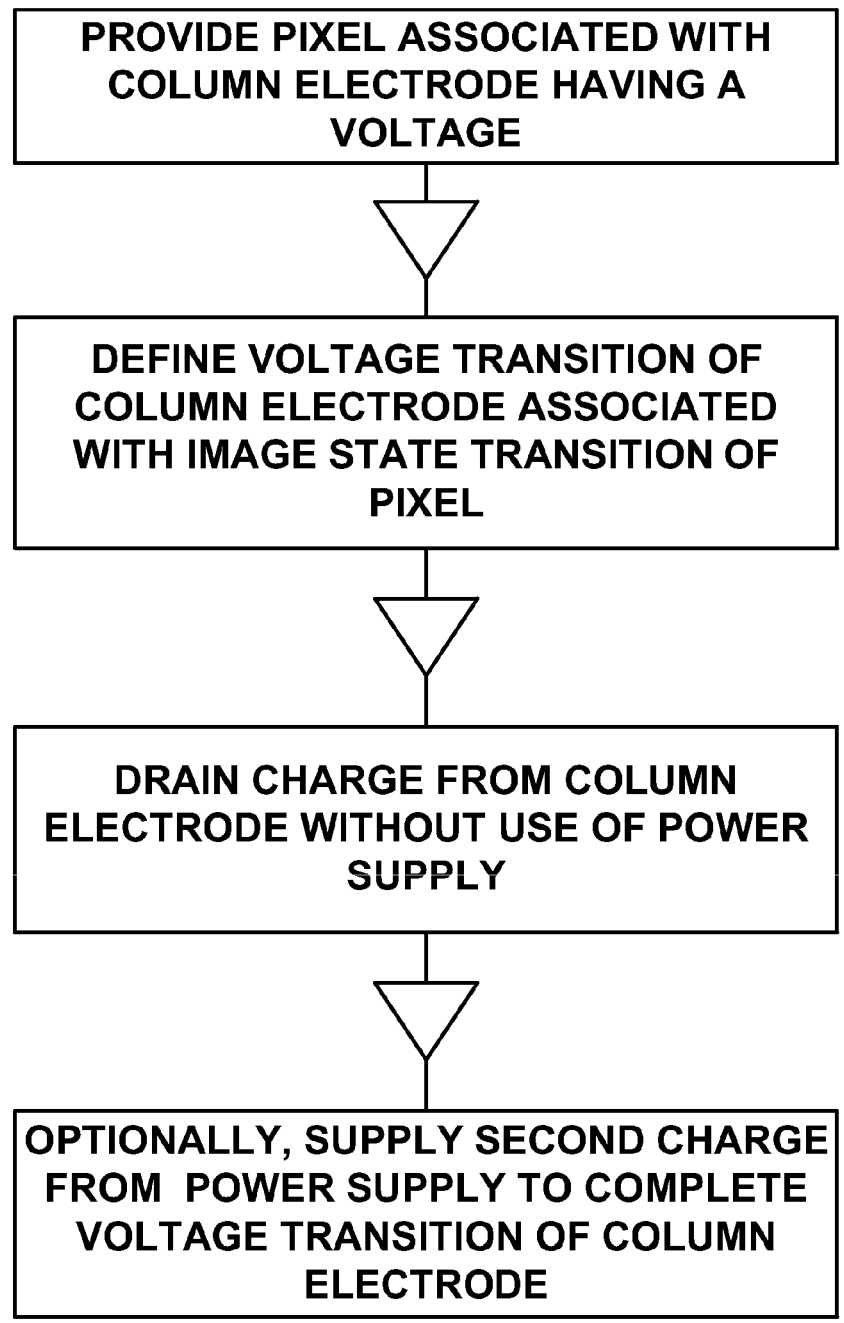
FIG. 1 of the accompanying drawings is a flowchart of a two-step voltage change method of the invention for addressing a display.

As already mentioned, the present invention has three main aspects, namely (a) two-step voltage change methods, and apparatus for carrying out such methods; (b) flexible large area displays; and (c) display module driver devices, and display assemblies containing such devices. These various aspects of the present invention will be described separately below, although it should be understood that a single display or driving method therefore may make use of more than one aspect of the present invention. For example, a DMDD assembly of the invention might effect a two-step voltage change method of the invention and might be used to drive a flexible large area display of the invention.

Two-Step Voltage Change Methods, and Apparatus for Carrying Out Such Methods

As already mentioned, this invention provides a method two-step voltage change method (TSVCM) for driving an electro-optic display having an electro-optic medium, a pixel electrode capable of applying an electric field to the electro-optic medium, and a column electrode associated with the pixel electrode. The TSVCM involves changing the voltage on the column electrode in a two-step process; in the first step, the voltage is changed from a first value to a third value intermediate the first (initial) and second (final) values for a period sufficient to permit charge to flow to or from the column electrode. Thereafter, in a second step, the voltage on the column electrode is changed from the third voltage to the second voltage. Also, as already indicated, the TSVCM is intended to reduce the power consumed by the display.

The TSVCM is based upon the realization that a change in column electrode voltage can be achieved with lower power consumption by first bringing the column electrode to an intermediate (third) voltage between the initial (first) and final (second) voltages which the change requires, without current provided by a power supply, and then charging the column electrode with current provided by a power supply to complete the column electrode voltage change. Typically, when the TSVCM is applied to a display comprising a plurality of column electrodes (and a commercial display may have several hundred column electrodes), the same third voltage is used for all the column electrodes, and this common third voltage may be ground or the voltage at which a common front electrode, on the opposed side of the electro-optic medium from the pixel electrodes, is held. Thus, in the TSVCM, only a portion of the charge required for the column electrode voltage change is provided by a power supply, with consequent reduction of the power provided by the power supply.

In the TSVCM, it is advantageous for the third voltage to be the arithmetic mean of the first and second voltages, since on average this provides the greatest reduction in power consumption. Using an arithmetic mean third voltage increases the frequency f in Equation A above by a factor of two, while effectively decreasing the voltage V which has to be provided by the power supply, by a factor of 2, with a resulting reduction in the power P by a factor of 2. Thus, display power consumption can be reduced by reducing the portion of a voltage change driven by power supply components by allowing charge to drain during a portion of a display update rather than by actively applying a current during that portion of the update.

The TSVCM may utilize display image numerical data signals that are known to one having ordinary skill in the electronic display arts. For example, a display can include a controller, e.g., a video card, that processes image bitmap data and forwards image data to logic circuitry. The logic circuitry, as known in the art, can receive numerical voltage impulse data that characterizes a voltage signal, horizontal timing data, and vertical timing data. The logic circuitry can then provide numerical signals to row and column drivers.

Since the power drawn from a supply is related to the square of the delivered voltage, a reduction in the voltage applied by driver components to achieve a change of the voltage of display columns may enable a large reduction in overall power consumption. Some embodiments of the invention, which do not require the provision of additional circuitry in conventional column drivers, enable a reduction of peak power output. Other embodiments, which do require the provision of additional circuitry, can decrease both average and peak power.

The advantages of the invention described above, together with further advantages, may be seen by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 1 is a flowchart showing the broad features of a TSVCM of the present invention. The method includes: providing a pixel associated with a column electrode having a voltage; defining a voltage transition of the column electrode, from a first voltage to a second voltage, associated with an image state transition of the pixel; and draining a charge from the column electrode to cause the voltage of the column electrode to transition at least partially to the second voltage. The charge can be drained without support of a power supply, and, thus, without power consumption by the supply. The supply may support only a portion of the full voltage transition, providing a reduction in peak and/or average power consumption of the display. Thereafter, optionally a second charge is provided from a power supply to the column electrode to complete the transition of the column electrode voltage to the second voltage.

Figure 2A:
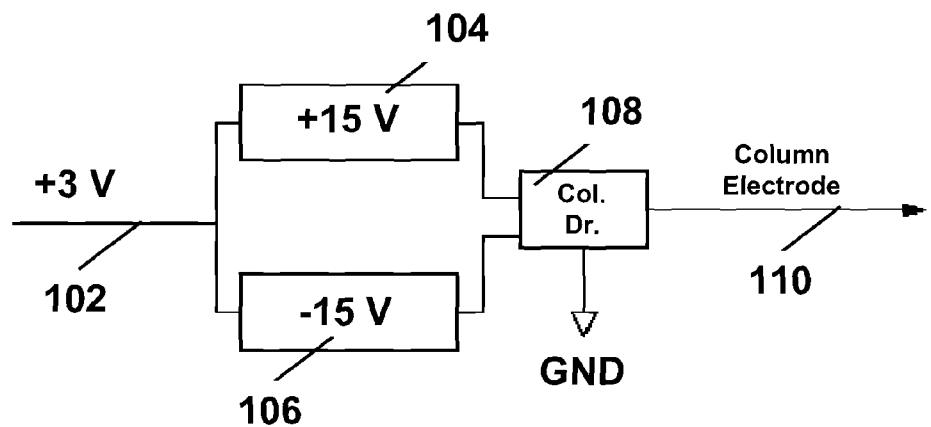
FIG. 2A is a block diagram of a column driver and associated apparatus for carrying out the method of FIG. 1.

FIG. 2A is a block diagram of apparatus (generally designated 100) used to addressing one column of a display. This apparatus includes an input line 102, which carries +3 V, for example from a battery. The input line is connected to a +15 V booster supply 104 and a −15V booster supply 106, with the +15 V and −15 V outputs from these booster supplies being fed to a column driver 108, which in turn is connected both to ground and to a column line or electrode 110 of a display. The display is an active matrix display having a common front electrode voltage of 0 V; the combined column capacitance is 20 nF and the row address time (i.e., the time for which each row is selected during a scan of the display is 30 sec. The booster supplies 104 and 106 are 80 percent efficient.

Figure 2B:
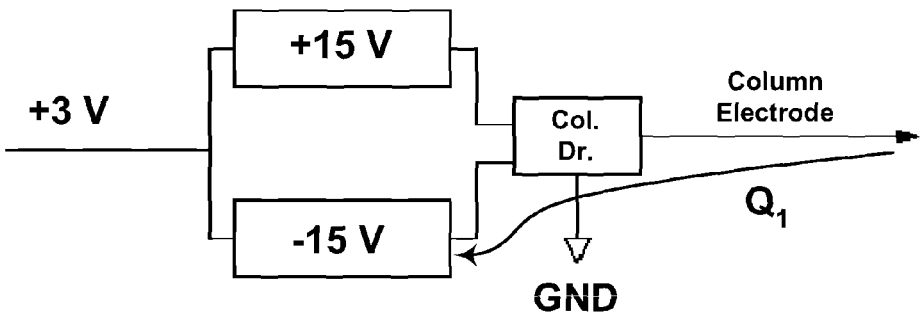
FIG. 2B is a block diagram similar to that of FIG. 2A showing the apparatus being used to carry out a prior art driving method.
Figure 2D:
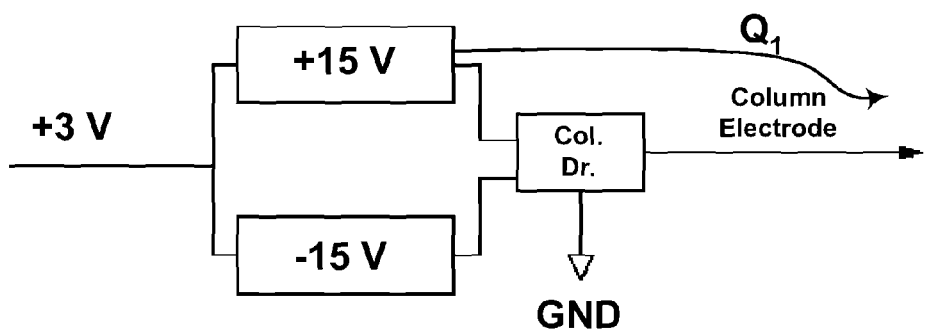
FIG. 2D is a block diagram similar to that of FIG. 2B but showing a later stage of the prior are driving method.
Figure 2C:
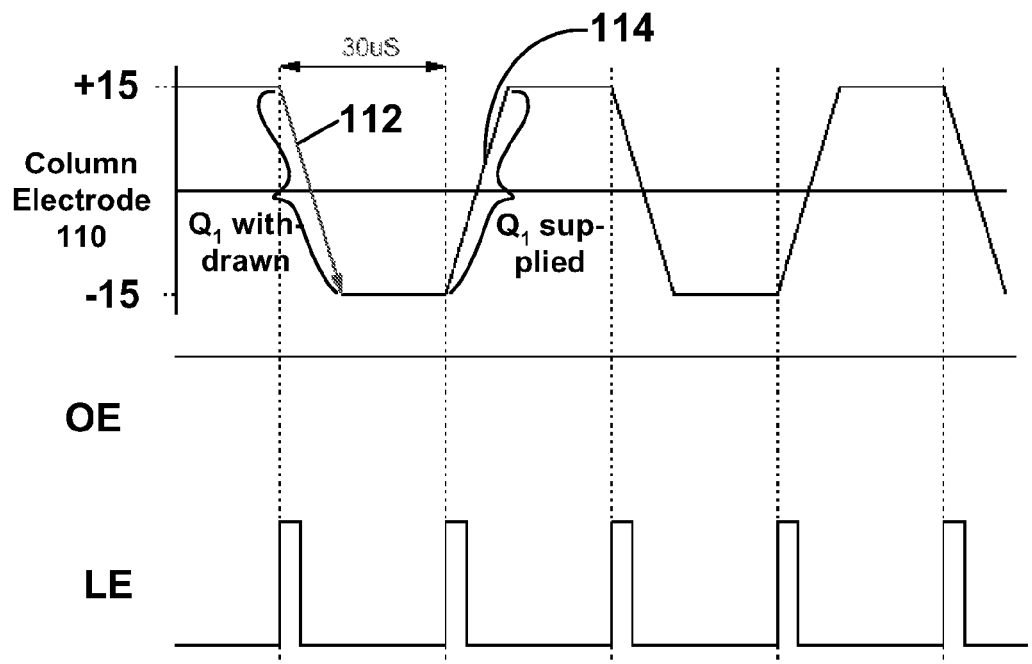
FIG. 2C shows graphs of the voltage applied to the column electrode in the driving method of FIG. 2B, and the values of certain control signals, all as a function of time.

Assume a worse case scenario in which the image being written comprises alternating black and white rows, so that the column electrode 110 must be switched between +15 V and −15 V every time a new row is selected. In the conventional method for writing such an image, as illustrated in FIGS. 2B and 2C, when a line enable (LE) signal goes high, the column driver 108 uses the −15 V booster supply 106 to deliver a charge of Q1 coulombs, to switch the column electrode 110 from +15 V to −15V, as illustrated at 112 in FIG. 2C.

When the next row of the display is selected 30 μsec later, the column electrode 110 needs to make a reverse transition from −15V to +15 V. Accordingly, as illustrated in FIGS. 2C and 2D, when LE again goes high, the column driver 108 uses the +15 V booster supply 104 to deliver a charge of Q1 coulombs to the column electrode 110, as illustrated at 114 in FIG. 2C.

In these two successive transitions occurring at 112 and 114, the value of $Q_1$ may be calculated as follows:

$$Q_1 = CV$$

$$Q_1 = 20 \text{ nF} * 30 \text{ V}$$

$$Q_1 = 600 \text{ nC}.$$

The positive going transitions will occur on alternate rows (for example, for inverting from white-to-black), or every 60 μS. So, in one second, the +15 V supply will provide 600 nC of charge 1 sec/60 μS times, which causes a current draw of 10 mA. Given the 80% booster supply efficiency, this corresponds to an average current of 62.5 mA at the 3.0V input, or a power draw of 187.5 mW.

Similarly, for the negative going transitions, the −15 V supply 106 supplies $Q_1$ coulombs of charge (for example, to invert the remainder of the rows from black-to-white), which results in another 187.5 mW of power at the input, giving a total capacitive power of 375 mW.

(The column driver 108 is provided, as is conventional, with an "Output Enable" ("OE") input, such that when this OE input is high, the column driver 108 can supply +15 V, 0 or −15 V to the column electrode 110, but that when OE is low, the column driver can only supply 0 V, the same voltage as supplied to the common front electrode of the display, independently of display data loaded into the driver. Normally the OE input is used for powering the display up or down, or sometime for implementing a sleep (low power) mode. As shown in FIG. 2C, during the prior art driving method, OE remains high throughout and thus has no effect on the output of the column driver 108.)

FIGS. 3A-3D illustrate use of the same apparatus as in FIGS. 2A-2D to carry out a two-step voltage change method of the present invention. This TSVCM differs from the prior art process of FIGS. 2A-2D in that the OE input of the driver 108 is used during column electrode voltage transitions to first discharge the column electrode 110 to 0 V, without using the booster supplies 104 and 106, before using one of the booster supplies 104 and 106 to charge the column electrode to the desired final value.

Figure 3B:
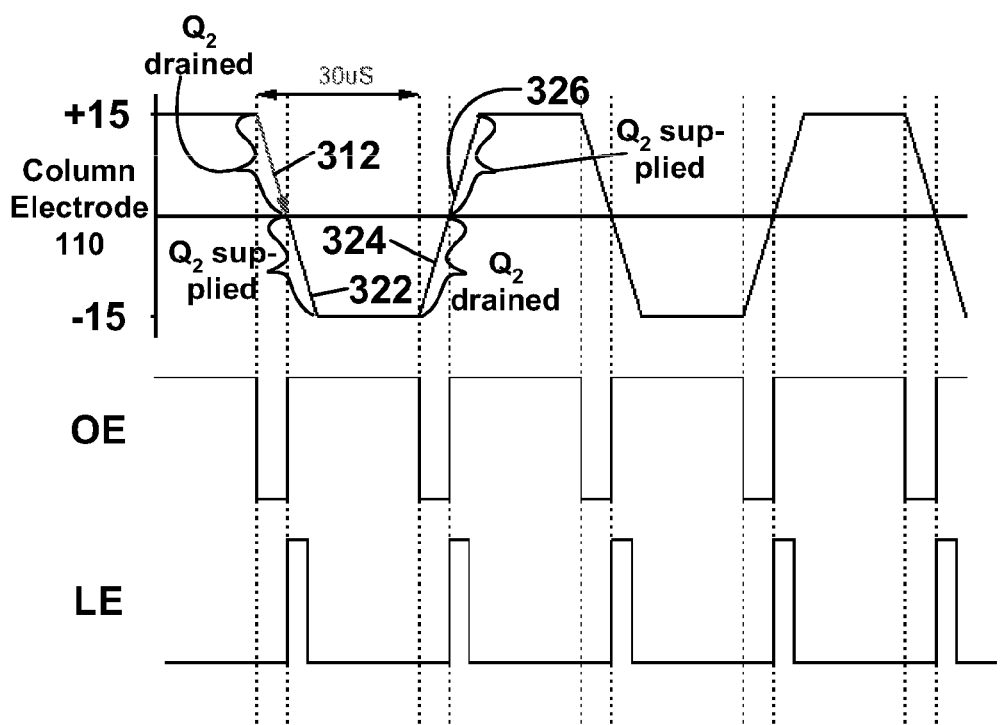
FIG. 3B shows graphs, similar to those of FIG. 2C, of the voltage applied to column electrode, and the values of certain control signals, as a function of time, for the two-step voltage change method of FIG. 3A.

FIG. 3B shows the same series of column electrode voltage transitions as FIG. 2C, again assuming a worst case scenario in which the column electrode voltage must be shifted from +15 V to −15 V, or vice versa, every time a new row is selected. As explained in detail below, a complete black-white-black cycle form one black row to the next black row two rows later is, according to the TSVCM of the invention, effected in four stages.

Figure 3A:
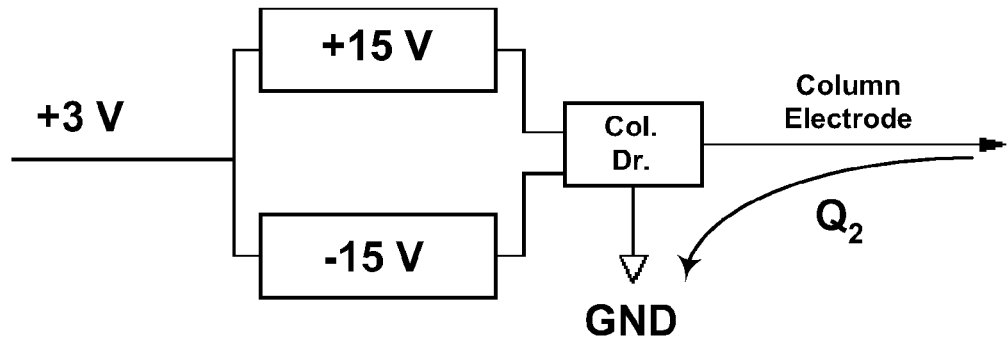
FIG. 3A is a block diagram, similar to that of FIG. 2B, but illustrating a first stage of a two-step voltage change method of the present invention.

The first part of the cycle is a transition of column electrode voltage from +15 V to −15 V, and this is effected in two stages. In the first stage, as illustrated in FIG. 3A and at 312 in FIG. 3B, OE goes low (while LE stays low), thus forcing the output of the column driver 108 to 0 V, and draining $Q_2$ from the column electrode 110 to the ground output of column driver 108. This stage does not drive any current from either supply 104 or 106.

Figure 3C:
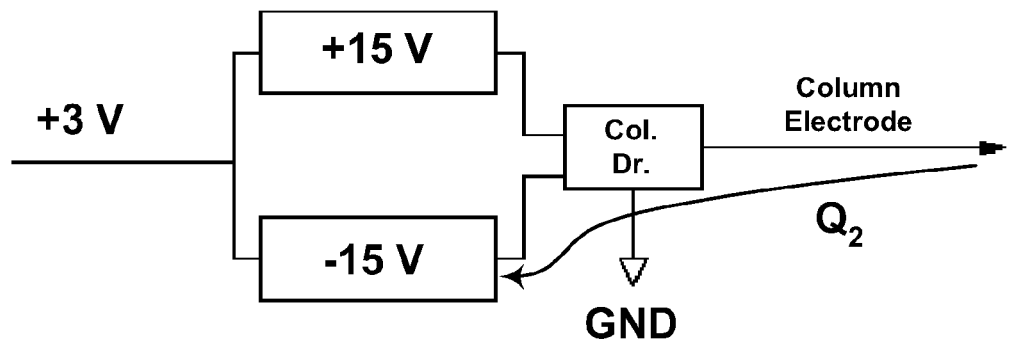
FIG. 3C is a block diagram, similar to that of FIG. 3A, but illustrating a second stage of the two-step voltage change method.

In the second stage of the cycle, as shown at 322 in FIG. 3B, a short time later (long enough for the column electrode 110 to drain at least most of the way to 0 V), both LE and OE are driven high. This has the effect of re-enabling the driver 110, and also latching the newly loaded row data to the output thereof. This causes the driver 110 to deliver $Q_2$ coulombs of charge into the −15 V supply 106, as illustrated in FIG. 3C, thus completing the +15 V to −15 V transition in two stages.

The third stage of the cycle, as shown at 324 in FIG. 3B, is very similar to the first stage. OE again goes low (while LE stays low), thus forcing the output of the column driver 108 to 0 V, and draining $Q_2$ from the ground output of column driver 108 to the column electrode 110; in other words, the situation is identical to that shown in FIG. 3A except that the current flow is reversed. Again, this stage does not require any current from the supplies 104 and 106.

Figure 3D:
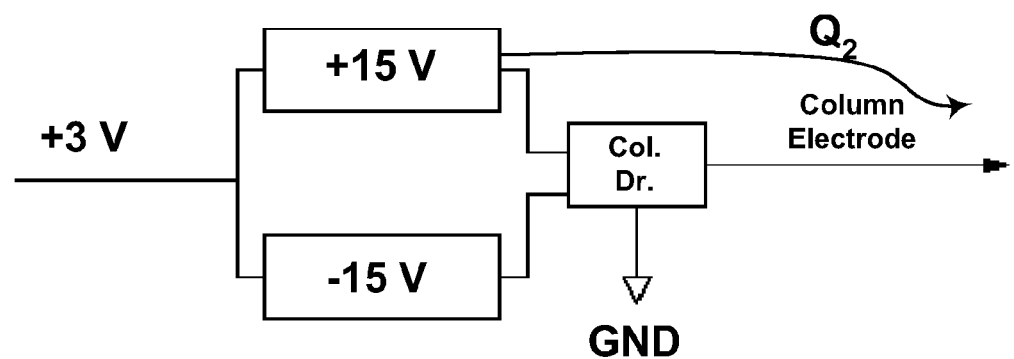
FIG. 3D is a block diagram, similar to those of FIGS. 3A and 3C, but illustrating the last stage of the two-step voltage change method.

Finally, in the fourth stage of the cycle, as shown at 326 in FIG. 3B, both LE and OE are driven high. This has the effect of re-enabling the driver 110, and also latching the newly loaded row data to the output thereof. This causes the supply 104 to deliver $Q_2$ coulombs of charge to the column driver 108, as illustrated in FIG. 3D, thus completing the −15 V to +15 V transition in two stages.

In the TSVCM shown in FIGS. 3A-3D:

$$Q_2=CV$$

$$Q_2=20\text{ nF}*15\text{ V}$$

$$Q_2=300\text{ nC},$$

as may be seen from the fact that the voltage in the TSVCM of the invention is half that in the prior art method. Thus:

$$Q_1=2Q_2$$

i.e., in the present method, the power supplies provide half as much charge as in the prior art method of FIGS. 2A-2D, and the present method effectively provides power to the column electrodes at half the voltage used in the prior art method. In the prior art method, with OE high throughout, $2Q_1$ coulombs of charge was supplied during one full (black-white-black) cycle (two rows). In the method of the present invention $4Q_2$ coulombs flow in or out of the column electrodes, but only $2Q_2$ coulombs was required from the power supplies; thus, one half the current of the prior art method was provided by the supplies, resulting in a total capacitive power of 187.5 mW at the input.

The TSVCM of the invention shown in FIGS. 3A-3D has the advantage of being usable on most conventional column drivers without modification of any circuitry. However, it does require forcing all column driver channels of the entire display to 0 V when it is necessary to drive OE low to cause draining of charge from one or more column electrodes. Thus, this TSVCM method may cause less than optimal power usage in circumstances where it is not necessary to switch the column electrode 110 between +15 V and −15 V whenever a new row is selected. For example, the method of FIGS. 3A-3D is not well adapted for switching between an all-black and an all-white screen (or more generally where a substantial number of adjacent pixels on the same column electrode need to undergo the same transition at the same time, as it not uncommon when the images to be displayed include substantial areas of solid color), since in these circumstances the column electrode 110 may stay at +15 V or −15 V for extended periods, with almost no capacitive power drain upon the supplies. Such a scenario is illustrated in FIG. 4A, which shows the voltage (assumed to be +15 V) on column electrode 110 and the OE and LE signals over several successive lines of a scan.

Figure 4A:
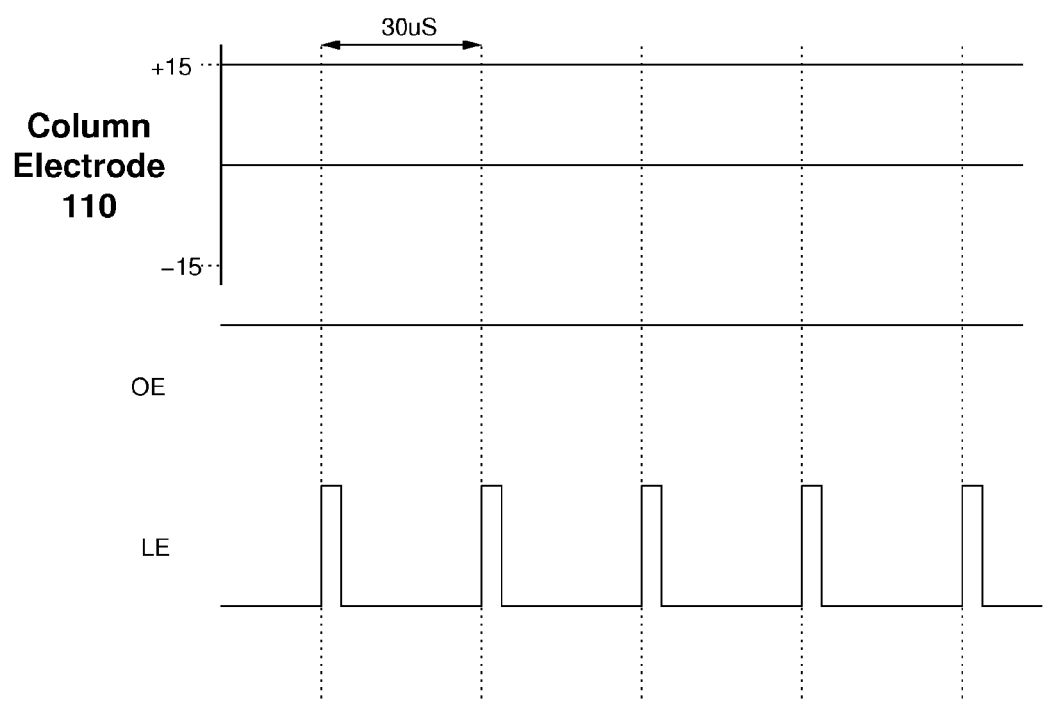
FIG. 4A shows graphs, similar to those of FIGS. 2C and 3B, but showing the corresponding signals for the prior art driving method when the same voltage is required on the column electrode for several successive periods.
Figure 4B:
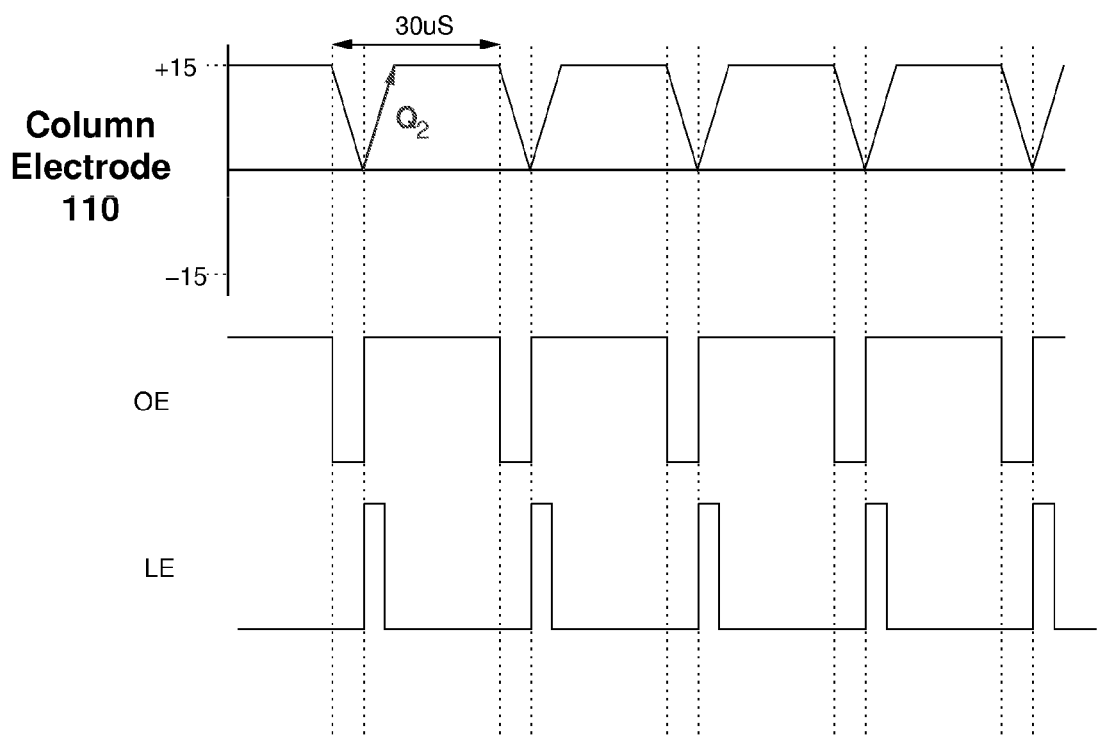
FIG. 4B shows graphs, similar to those of FIG. 4A, for a two-step voltage change method of the present invention under the same conditions as in FIG. 4A.

FIG. 4B shows the same signals as FIG. 4A when the TSVCM of FIGS. 3A-3D is applied to the same scenario. As shown in FIG. 4B, each time OE goes low (i.e., just before each new row is selected), the column electrode is forced to dump its charge to ground, and then the +15 V supply 104 must be used to charge the column electrode 110 back up to +15 V, thus requiring this supply to provide Q2 at every new row selection, so that the power consumed would be about one-half of the power consumed in the alternating row example of FIGS. 3A-3D. In this case, however, power is needlessly consumed to effect each transition back to +15V because charge was needlessly dumped to drop the column electrode voltage level to the common voltage level.

Such unnecessary power consumption can be avoided by more elaborate methods of the present invention which require modification of driver circuitry, and one such method will now be described in reference to FIGS. 5-7. The method to be described enables individual column electrodes to be drained in a manner similar to that effected in the method of FIGS. 3A-3D, but only when the column electrode voltage is to be changed; when the column electrode voltage is to remain the same, the dumping of charge to ground can be avoided, and thus unnecessary power consumption caused by the need to recharge the column electrode is also avoided.

Figure 5:
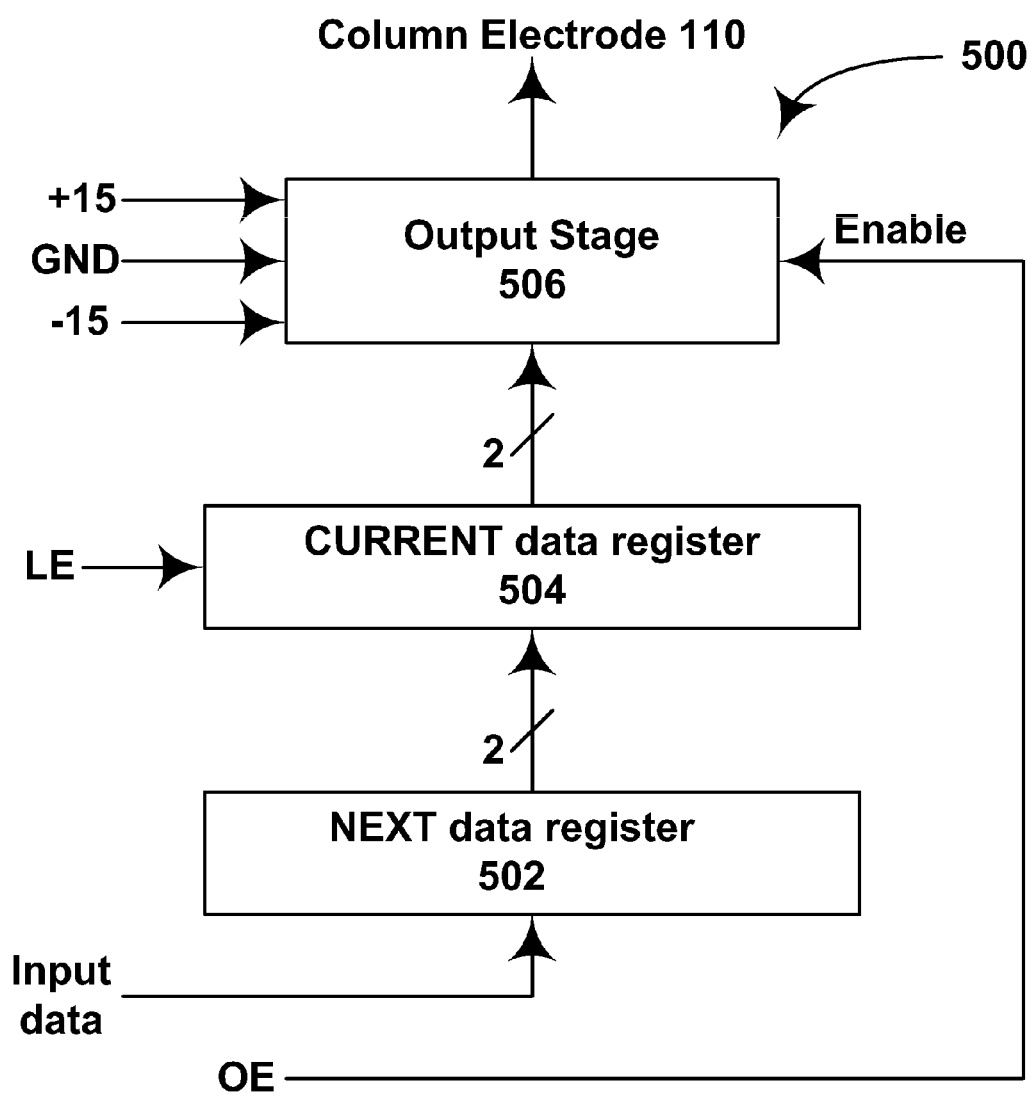
FIG. 5 is a block diagram of one channel of a prior art column driver (i.e., the portion of such a driver used to control one column electrode).

FIG. 5 illustrates one channel of a column driver (generally designated 500), i.e., the portion of the column driver used to control one column electrode. The channel of the column driver 500 comprises a first (NEXT) data register 502, a second (CURRENT) data register 504 and an output stage 506. The CURRENT data register 504 receives the LE signal, while the output stage 506 has inputs for +15 V, −15 V, ground and the global OE signal (at an "Enable" input), and an output connected to the column electrode 110.

The apparatus shown in FIG. 5 operates in the following manner. Two-bit Input data is loaded into the NEXT data register 502 by an input clock and input shift register logic (neither of which is shown in FIG. 5). When LE goes high, the data from the NEXT data register 502 is loaded into the CURRENT data register 504. The output stage 506 functions asynchronously from the registers 502 and 504 and outputs +15 V, 0 (Ground) or −15 V on column electrode 110 depending upon the data bits in the CURRENT data register 504 and the value of the OE signal, in accordance with the Table below, in which D1 and D0 are respectively the most and least significant bits in the CURRENT data register 504, and X represents 0 or 1:

TABLE

| OE | D1 | D0 | Output on column electrode |
|---|---|---|---|
| 1 | 0 | 0 | 0 (GND) |
| 1 | 0 | 1 | +15 V |
| 1 | 1 | 0 | −15 V |
| 1 | 1 | 1 | 0 (GND) |
| 1 | X | X | 0 (GND) |

Figure 6:
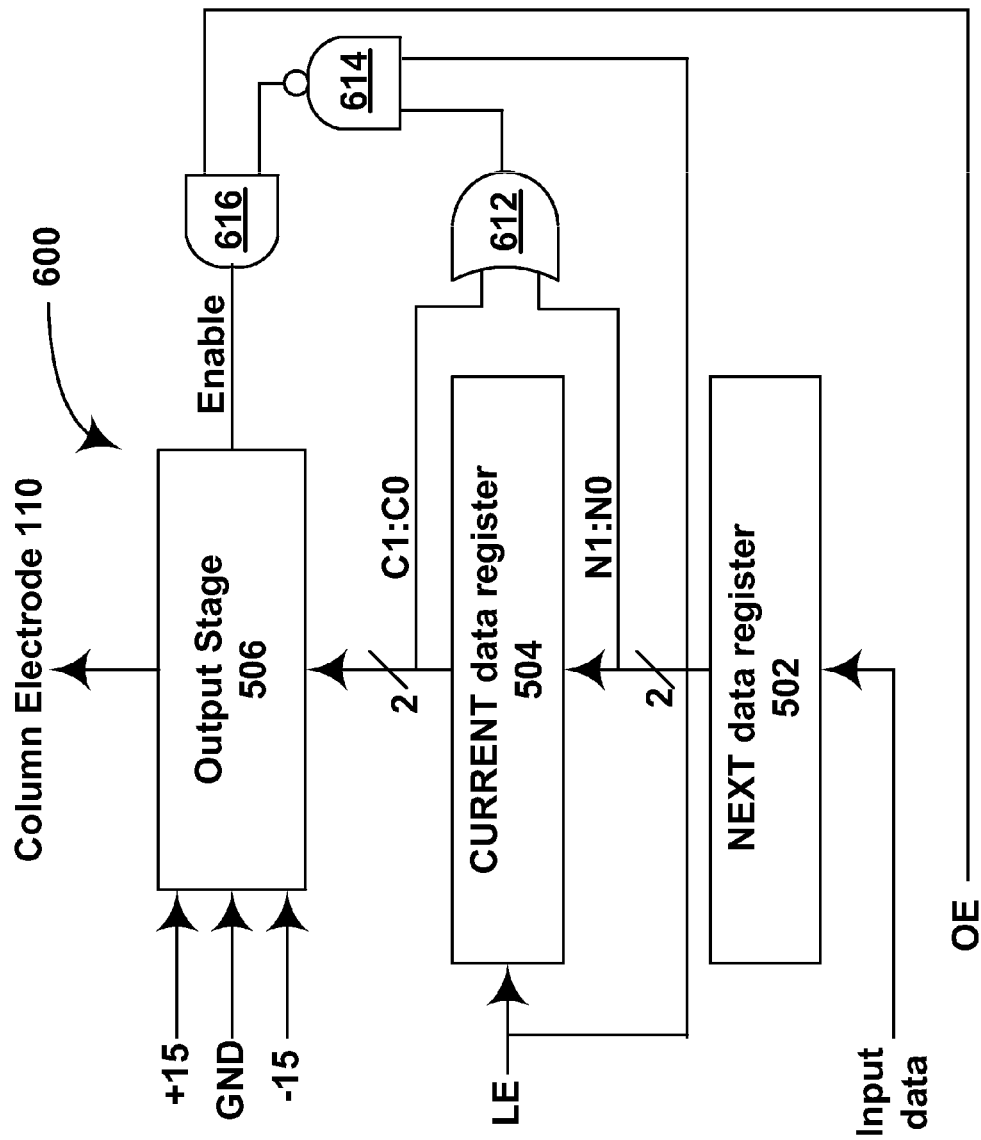
FIG. 6 a block diagram, similar to that of FIG. 5, showing one column of a modified driver adapted for use in the two-step voltage control method of the invention.

FIG. 6 shows one channel of a modified column driver (generally designated 600) derived from the column driver 500 shown in FIG. 5 but adapted to carry out a TSVCM of the present invention in which charge dumping from column electrodes is controlled on a channel-by-channel basis. The column driver 600 comprises a NEXT data register 502, a CURRENT data register 504 and an output stage 506, all of which are identical to the corresponding integers of the column driver 500, except that the Enable input of output stage 506 does not receive the global OE signal but instead receives a control signal generated as described below, and the clocking of the NEXT data register 502 is changed to the falling edge of the LE signal.

The column driver 600 further comprises an XOR gate 612, the inputs of which receive the two-bit data values from the NEXT and CURRENT data registers 502 and 504. Thus, the output of XOR gate 612 goes high only when the values in the two data registers differ, indicating a change of input data. The output of XOR gate 612 is fed to one input of a NAND gate 614, the other input of which receives the LE signal. Thus, the output of NAND gate 614 will go low only if both the output of XOR gate 612 is high (indicating a change in input data) and LE is high. The output from NAND gate 614 is fed to one input of an AND gate 616, the other input of which receives the global OE signal. The output of AND gate 616 is fed to the Enable input of output stage 506.

It will be apparent to those skilled in display driver design that various other logic combinations can be used in place of the gates 612. 614 and 616 to produce the same effect.

Figure 7:
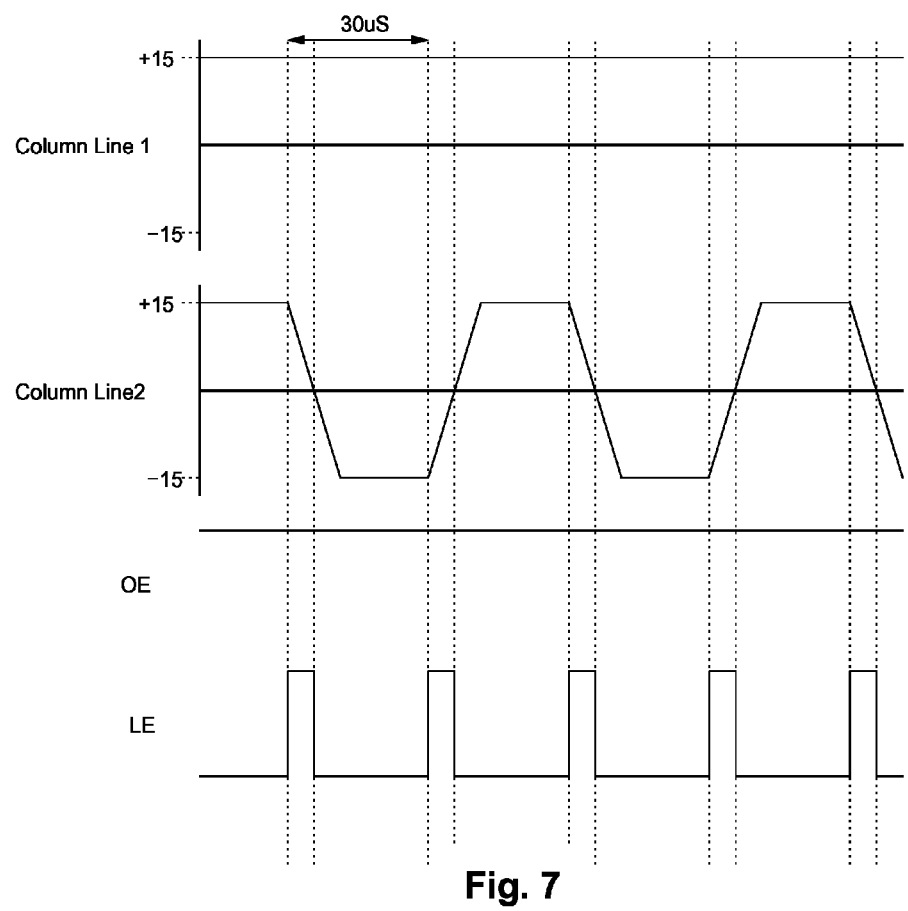
FIG. 7 is a graph, similar to those of FIGS. 2C, 3B, 4A and 4B showing the voltages applied to pixels in the same column but in two adjacent lines of a display, and certain control signals, all as a function of time, when using the driver of FIG. 6 to carry out a preferred two-step voltage change method of the invention.

FIG. 7 illustrates the variation with time of the column electrode voltages placed on the column electrode 110 by the column driver 600 of FIG. 6 for transitions in which no change in column electrode voltage is required (see top of FIG. 7) and for which the column electrode voltage needs to be switched from +15 V to −15 V, or vice versa, as each successive row is selected (see middle of FIG. 7). In the former case, no charge dump occurs, while in the latter case a TSVCM is carried out in substantially the same manner as in FIG. 3B, except that the time of column voltage changes is shifted slightly against the changes in the LE signal. FIG. 7 also shows the values of OE and LE. It will be seen that OE is kept high throughout, having regained its original function of being used only for powering the display up or down, or switching the display to a sleep mode.

More specifically, the column driver 600 handles the transitions shown in FIG. 7 as follows. If LE goes high, but there is no change in data, the output of XOR gate 612 stays low, the output of NAND gate 614 stays high and the output of AND gate 616 stays high (remember that OE is now held always high). The resultant high input at the Enable input of output stage 506 causes the output stage to maintain the same voltage on column electrode 110 and prevents any charge dumping, as illustrated in the upper section of FIG. 7.

However, if when LE goes high, there is a change of data, the output of XOR gate 612 goes high, the output of NAND gate 614 goes low, and the output of AND gate 616 goes low. The resultant low input at the Enable input of output stage 506 causes the output stage to dump charge to or from the column electrode 110 to the GND input of the output stage 506, if the column electrode 110 has previously been at a voltage different from ground, as illustrated in the central section of FIG. 7. This charge dumping continues so long as LE remains high. Hence, in FIG. 7, the rising edge of signal LE is synchronized with the beginning of charge dumping, rather than with the beginning of recharging of the column electrode, as in FIG. 3B.

LE remains high long enough for most or all of the charge to be dumped from the column electrodes which need to change voltage, typically for a period of a few microseconds. When LE thereafter does low, the CURRENT data register 504 is updated with the data from the NEXT data register 502, the output of XOR gate 612 goes low, and the Enable input of output stage 506 receives a high signal, which re-enables the output stage 506 and causes it to place on the column electrode 110 the voltage corresponding to the data in the CURRENT data register 504. In the central section of FIG. 7, this is assumed to be −15 V. It will readily be apparent that a transition from −15 V to +15 V is handled in an exactly similar manner.

Modification of the prior art column driver 500 of FIG. 5 to produce the driver 600 of the present invention requires only the addition of three logic gates per channel, and this change can be implemented, in an integrated circuit, without a significant increase in die size, and hence with little impact on column driver cost. However, the driver 600 reduces both average and peak capacitive power consumption by a factor of two, as compared with the prior art column driver 500.

In summary, simple forms of the column drivers of the present invention, such as that shown in FIGS. 3A-3D, which do not require a change in circuitry, can reduce peak power demand, and may thus be useful, for example, in some cases where there is an upper bound to the instantaneous current draw, for example in a device powered by alkaline batteries. More complex forms of the column drivers of the present invention, such as that shown in FIGS. 6 and 7, which do require a change in circuitry, can substantially reduce both average and peak capacitive power, by a factor of about 2, at a given drive voltage.

Flexible Large Area Displays

As already mentioned, in its second main aspect this invention provides an electro-optic display system comprising a flexible substrate and a plurality of flexible electro-optic display units attached to the flexible substrate, together with a process for producing such an electro-optic display system, the process comprising providing a flexible substrate, providing a plurality of flexible electro-optic display units and affixing the plurality of flexible electro-optic display units to the flexible substrate.

This aspect of the invention is based upon the realization that a low-cost light-weight large area flexible display systems can be manufactured by laminating multiple smaller flexible display units to a flexible sheet. Large area displays, of the invention, can be manufactured from relatively inexpensive materials and sub-components, using low-cost process steps such as printing and laminating steps, and hence can be relatively inexpensive to manufacture. This aspect of the invention can provide, for example, inexpensive large area signs for indoor and outdoor use. The large area displays can be effectively maintenance-free and weatherproof.

Figure 8:
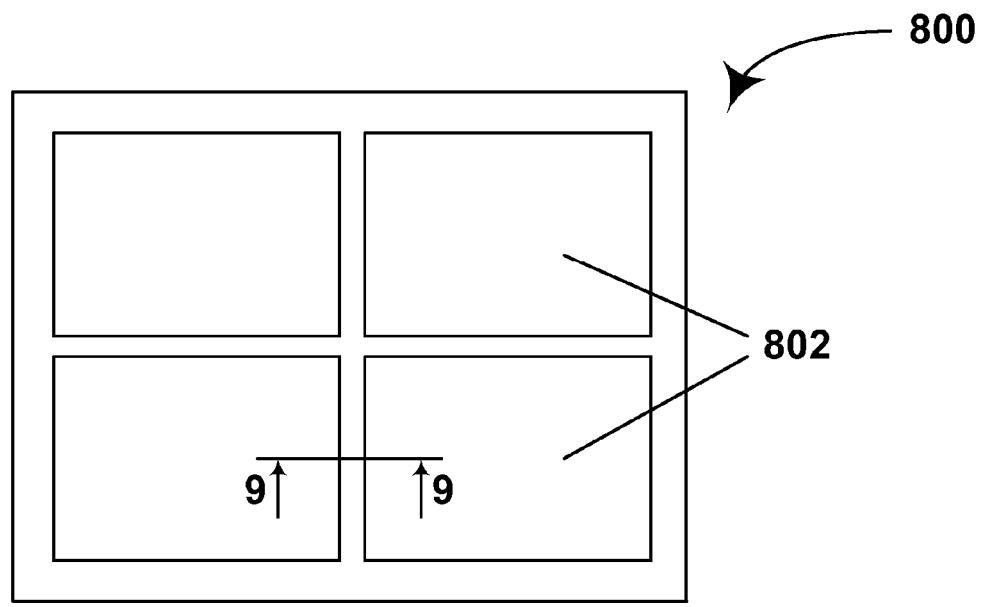
FIG. 8 is a schematic top plan view of a flexible large area display of the present invention.
Figure 9:
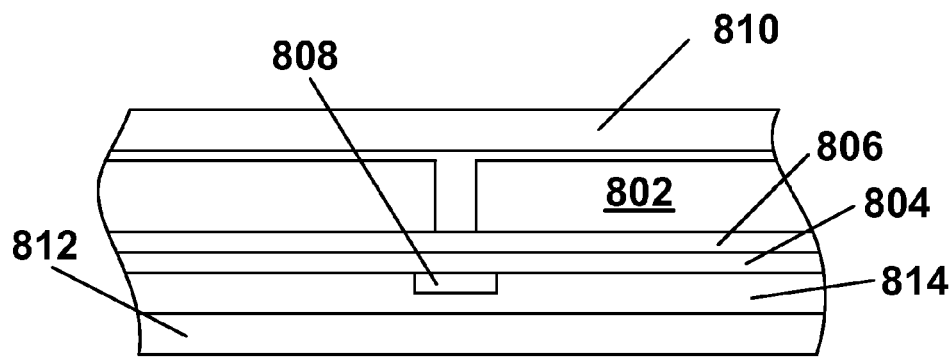
FIG. 9 is a schematic section along the line 9-9 in FIG. 8.

A preferred flexible large area display system (FLAD) of the invention will be described with reference to FIGS. 8 and 9 of the accompanying drawings. FIG. 8 is a schematic top plan view of such a FLAD (generally designated 800), while FIG. 9 is a section taken along the line 9-9 in FIG. 8. The FLAD 800 comprises a flexible substrate 804, which may be a clear plastic film, and flexible display units 802 attached to the substrate 804 by a clear adhesive layer 806. (The display system 800 and the individual display units 802 may both be referred to herein as "displays" where no ambiguity results.) Thus, the FLAD 800 achieves a large display area by combining multiple display units 802 to form a single display system. Rather than providing a large, rigid, and expensive-to-manufacture display system, the display system of the present invention can be relatively thin and light, and easy and inexpensive to manufacture.

The display units 802 include flexible materials, such as polymeric substrates. The display units may be based on reflective display media, such as any of the types of electro-optic media described above. The size of the display system may thus be readily increased through use of a larger area substrate and larger or more numerous display units. The overall thickness of the display system need not increase with increasing area. For portability, the display system may be, for example, able to be rolled into a relatively compact tube shape.

In addition to the adhesive layer 806, the FLAD 800 comprises a mask layer 808 that covers optically inactive areas of the FLAD i.e., areas between the display units 802, and (depending upon the nature of the display units 802, possibly also peripheral or bezel areas of the display units themselves. The provision of the mask layer 808 is optional, and its function may also be carried out by coloring or surface treatment of another layer of the FLAD, for example the front protective sheet (described below) or by providing masking inserts between the display units 802. Indeed, although the illustrated FLAD 800 is not constructed in this matter, the display units 802 could be inserted into apertures in a masking layer, which would serve to hold the display units in place during assembly of the FLAD.

The FLAD 800 further comprises a protective sheet 810, which serves to protect the display units 802 from mechanical damage, and a cover sheet 812 which is secured to the substrate 804 by an adhesive layer 814; the protective sheet 810, the cover sheet 812 and the adhesive layer 814 are all optional components of the FLAD. Although not shown in FIGS. 8 and 9, alignment marks may be provided on one or more layers of the display to assist positioning of the display units 802 relative to the substrate 804, or other substrate or layer of the FLAD.

The viewed surfaces of the display units 802 are preferably oriented toward, and viewed through, the substrate 804, i.e., from below in FIG. 9. The substrate 804 or cover sheet 812 may have an antiglare property. For example, either of these layers may have a rough surface, or may be coated with an anti-glare material.

The layers of the display system are preferably laminated, e.g., vacuum-laminated, together. Lamination can support relatively simple and low cost manufacturing processes. Lamination can also support fabrication of a weather-tight, reliable display system for outdoor use.

Figure 10:
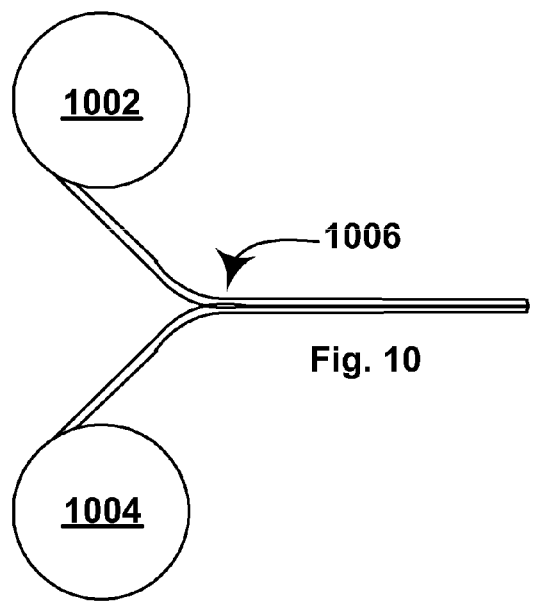
FIG. 10 is a schematic view of a roll-to-roll lamination process which may be used to manufacture the flexible large area display shown in FIGS. 8 and 9.

FIG. 10 is a schematic side elevation of a manufacturing process for FLAD's of the present invention. A roll 1002 of flexible substrate material (which will form the substrate 802 of the final FLAD) and a roll 1004 of display units 802 (on a carrier) respectively feed substrate material and display units to a lamination station (indicated schematically at 1006) of the manufacturing process. An adhesive can be supplied, for example, at the time of lamination, or can be included with one of the rolls of components. It will be apparent to one having skill in lamination processes that modifications to the process illustrated in FIG. 10 can support a variety of display system structures, according to principles of the invention.

The FLAD method of the present invention allows flexible display units to be assembled into a flexible display system. The method also permits optical coupling of display units to a front sheet that, for example, reduces glare and/or viewing angle. The display system can include an encapsulant to provide, for example, weather-resistance and tamper-resistance. The display system of the invention, may provide relative ease of assembly. Optical coupling of the substrate to the display units may provide, for example, reduced first surface reflections.

In an alternative method of manufacturing a large area display according to the invention, a clear sheet of plastic is used as a substrate. A suitable clear plastic sheet can be formed from, for example, polyester, acrylic, polycarbonate, polycarbonate-polyvinyl fluoride composites, and clear fluoropolymers. The front surface of the sheet may be roughened to, for example, reduce glare. The sheet may provide ultra-violet radiation filtering to protect the display. The back surface may be printed with a masking pattern—for example, of opaque or filtering inks—with openings for the display units to show through. Either liquid or sheet adhesives, for example, are suitable for inclusion in the display.

The display units are then arranged on the front sheet to correspond to the printed openings. Alignment marks can be printed on the back of the front sheet to assist in the alignment. On the rear of the display units, additional adhesive may be applied, as may an additional cover sheet. Optionally, the back can be left open. This structure is then laminated to provide a bubble free coupling between the adhesive and the display units.

Suitable adhesives include hot melt materials such as ethylene vinyl acetate, polyamide, and polyurethane, and liquid materials such as silicone, epoxy, and polyurethane. The lamination procedure may entail, for example, roll lamination and/or vacuum lamination.

The above-described methods and structures can utilize, for example, any type of plastic-based electronic display unit, such as any of the electro-optic and other imaging media described above.

Display Module Driver Devices, and Related Display Assemblies

As already mentioned, the third main aspect of the present invention provides a display module driver device for controlling an image to be displayed upon a display module comprising a plurality of pixels each having a pixel electrode associated therewith. The driver device comprises input means for receiving data representing an initial and a final image to be displayed; translation means for translating the data received by the input means into pixel-wise representations of the initial and final images; storage means for storing the pixel-wise representations of the initial and final images; a plurality of output means arranged to control voltages to be applied to the pixel electrodes of the display;

and logic means arranged to receive data from the storage means and to generate from this data the outputs required on the plurality of output means. This third main aspect of the invention also provides a display assembly comprising a plurality of display modules each of which has a display module driver device of the invention associated therewith and arranged to control the image displayed on its associated display module, and display assembly input means arranged to receive image data representing images to be displayed on the display assembly and to provide at least part of the image data to each display module driver device.

As previously explained, prior art electro-optic displays (for example, those described in the aforementioned 2003/0137521, Ser. Nos. 10/814,205 and 10/879,335) have typically been addressed by a single controller which effects conversion of a received image in a "non-displayable" format, which does not correspond to the pixel-by-pixel data required by the display, to a "displayable" format as required by the display (although the controller may off load this conversion on to an external data processing means, for example a personal computer used to drive the display). The non-displayable format may be a non-bitmap format, for example ASCII text, or a compressed bitmap format, for example a TIF or JPEG file, or one of various types of LZW-compressed bitmaps. Regardless of the exact non-displayable format of the data received and the exact location of the conversion, in this type of display, the controller outputs image data in a displayable format, as required by the display. Such displayable data is then passed to one or more essentially "dumb" drivers which drive the pixels of the display using the displayable data.

While this type of centralized processing and data conversion by a single controller is satisfactory for many displays, it presents problems when the display is a high resolution display with a very large number of pixels, or a display assembly (such as a FLAD of the present invention) which comprises a number of separate modules each having separate drivers. The displayable data is typically much larger than the non-displayable data, and hence moving such data from a central controller to a series of discrete modules requires the provision of high bandwidth data distribution channels. Such channels are likely to be more expensive than low bandwidth channels and may be more susceptible to data corruption, for example from electromagnetic interference or "noise".

Actually, the situation is more complicated than outlined above, at least in the case of impulse-driven, bistable electro-optic displays. As described in the aforementioned 2003/0137521, Ser. Nos. 10/814,205 and 10/879,335, in such displays the waveform which is applied to any given pixel during a transition from one image to another is a function not only of the desired final optical state of the pixel but also of the initial state thereof, i.e., the state from which the transition begins. Depending upon the exact drive scheme being used, the waveform may also be a function of one or more prior states of the pixel (prior to the initial state), one or more environmental parameters, such as temperature and humidity, and other non-environmental parameters, for example the total operating time of the electro-optic medium being used. Furthermore, as described in these applications, it may be desirable to use relatively complex waveforms, in which a single transition by one pixel requires application of a string of different voltages to the pixel electrode associated with that pixel, so that the controller has to output data defining not merely one voltage to be applied to one pixel during a transition, but data defining a string of such voltages. This further increases the bandwidth of the data distribution channels. Finally, as noted above, data loading by the display drivers may take a significant amount of time.

The display module driver device (DMDD) of the present invention, and the related DMDD assembly, seek to overcome, or at least alleviate, these problems by, essentially, moving data conversion "downstream" to individual display modules, thereby keeping the image data in its non-displayable, low bandwidth form for as long as possible.

In a DMDD assembly of the present invention, it will typically be necessary to distribute data from a single "global" input by which the assembly receives data from an outside source, for example a video card, to the various DMDD's in the assembly, and (at least in the case where each display module is to display only a portion of the complete image to be displayed by the assembly) to ensure that each DMDD acts on only the portion of the data relevant to its portion of the image. A variety of techniques for such purposes will be known to those skilled in data distribution and processing techniques and any known technique may be used in the DMDD assemblies of the present invention. For example, data may be distributed using a daisy-chaining arrangement whereby each DMDD is provided with a data output means (separate from the output means which controls the voltages on the pixel) connected to the input means of the next DMDD in the chain. One example of such a daisy-chaining arrangement is that implemented in the Supertex HV577 integrated circuit; in this arrangement, an output on the first DMDD is connected to an input on a second DMDD, an output on the second to an input on a third, etc. On receipt of a first timing pulse, the first DMDD loads a fixed quantity of data from a global data input. On receipt of a second timing pulse, the first DMDD transfers the data already present therein to the second DMDD, and loads a second quantity of data from the input. This process until all the DMDD's in the chain have been loaded with data, whereupon all DMDD's receive a control signal to latch the data which they contain in an appropriate data storage register.

Alternatively, data from the global data input may be sent in parallel to all the DMDD's, with provision for ensuring that each DMDD retains only the data relevant to itself. For example, this may be achieved by a token passing method. In such a method, a data bus extends in parallel from a global input to each of a plurality of DMDD's. Each of the DMDD's has a token input and a token output, with one of the token inputs being connected to a controller and the other token inputs being connected to the token output of another DMDD, thus again essentially daisy-chaining the DMDD's. A first set of data is placed on the bus and an electronic token is sent from the controller to the DMDD having its token input connected directly thereto. This DMDD reads the first set of data from the bus and places it in a storage register. A second set of data is then placed on the bus, and the DMDD which read the first set of data sends the electronic token to the second DMDD in the chain, thereby causing this second DMDD to read the second set of data from the bus into a storage register in the second DMDD. The process is repeated until all DMDD's have read a set of data from the bus, whereupon the electronic token is returned to the controller.

A third possible arrangement, usually called a "chip enable method" is similar to the second in that a data bus extends from a global input in parallel to all the DMDD's. However, the token arrangement is replaced by a set of chip enable lines, one of such lines extending from the controller to each DMDD. A first set of data is placed on the bus, and one chip enable line is selected, thereby causing the DMDD associated with this chip enable line to read the first set of data from the bus into a storage register in this DMDD. A second set of data is then placed on the bus, a different chip enable line is selected, and the process continues until all the DMDD's have received data.

Other arrangements may of course be used. For example, a controller could simply broadcast to all DMDD's a series of addressed data packets, each comprising an address of the DMDD which is to receive the data, and a set of data. All DMDD's would receive all packets, but record in their storage registers only the sets of data addressed to them.

The DMDD of the present invention receives at its input means data representing an initial and a final image to be displayed. The translation means of the DMDD translates each of these sets of data into binary representations of the two images, and stores these binary representations in the storage means of the DMDD. The translation module or storage means may then transmit the binary representations of the images to the logic means, which uses the binary representations to determine the outputs required on the output means, i.e., the various elements of the waveform of an output signal. The logic means may be arranged to vary to required outputs depending upon at least one of an environmental parameter (such as temperature or relative humidity), a parameter representative of the operating life of the display module, and a parameter representative of the electro-optic characteristic of the display module. (Note that this ability to modify the output according to a parameter representative of an electro-optic characteristic of the display module facilitates replacement of individual modules in a display assembly. Provided the relevant DMDD is provided with the correct parameters, a module containing one type of electro-optic medium can be removed from the assembly and replaced with a module containing an electro-optic medium having different characteristics, without affecting the overall appearance of the display assembly.) The output means then transmits the relevant outputs to the electrodes applying voltages to the electro-optic medium.

Figure 11:
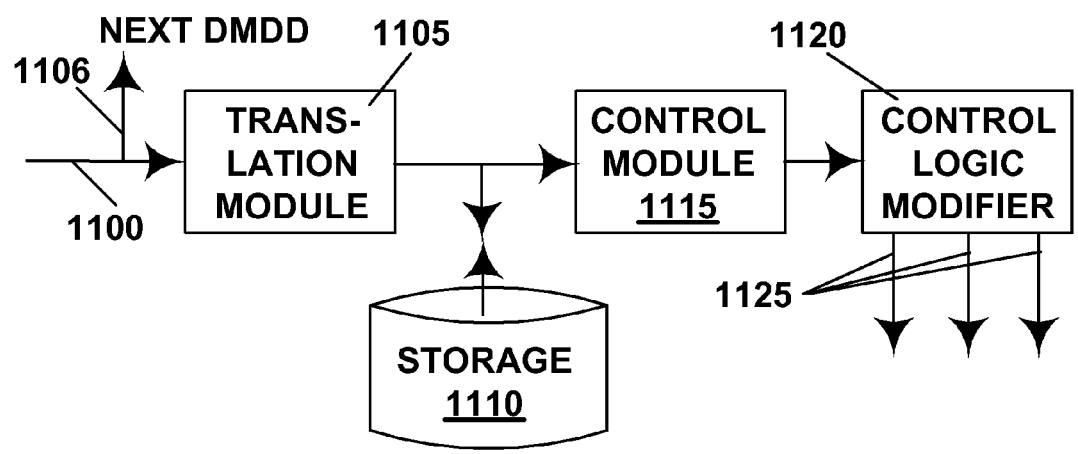
FIG. 11 is a block diagram of a display module driver device of the present invention.

FIG. 11 is a block diagram of a DMDD of the present invention. Data, such as character (for example, ASCII text) or 1-bit matrix data, is received from a data source (not shown) at an input means or terminal 1100. The data may be generated in real time and transmitted to input terminal 1100 directly or via, for example, a wired or wireless network. The data may also be stored data from, for example, optical or magnetic storage media. Input terminal 1100 may be a serial port or a parallel, USB or IEEE 1394 port. The input terminal 1100 may, for example, conform to I2C, LVDS, or other industry-standard signal interface. Input terminal 1100 may accept input data in a variety of formats, including for example, ASCII, Unicode, bitmap, RLE-compressed bitmap, or any format used to represent character or matrix data.

Input terminal 1100 transmits the input data to a translation means or module 1105. (As indicated schematically at 1106, input terminal 1100 may also transmit the input data the next DMDD in a chain.) Translation module 1105 functions to convert the input data, typically from character or bitmap format, into a pixel-wise binary representation of an image to be displayed. For mosaic, starburst, or n-segment displays, the data conversion performed by translation module 1105 may be fixed by the backplane pattern. In the case of a matrix display, the data conversion for alphanumeric characters may be based on a built-in font. Alternatively, the data conversion may be based upon a font that is stored in re-writeable or write-once memory storage, or even embedded in the input data. For non-alphanumeric characters, translation module 1105 is capable of interpreting a variety of compression routines to regenerate the original image.

Next, translation module 1105 may transmit data to storage means or module 1110 for storing the data output of translation module 1105 for current or future use. Storage module 1110 typically includes re-writeable memory. However, storage module 1110 may also include write-once memory. Furthermore, storage module 1110 may be in the form of a database, but need not have the ability to create data structures or support data fields. When the amount of data to be stored is large, it may be advantageous to provide storage module 1110 with data compression/decompression means to reduce the amount of data which is actually stored and to regenerate the original data when required.

From the explanation above, it will be understood that translation module 1105 generates, and storage module 1110 stores, data representing at least two successive images (the initial and final images for a single rewriting of the image displayed on the associated display module), so that control module 1115 (described below) can use the data for these two images to calculate the outputs needed on the output means. Depending upon the exact drive scheme being used, storage module 1110 may store data relating to more than two images, and may also store data relating to the aforementioned environmental and non-environmental parameters.

The DMDD further comprises a logic means, which for purposes of explanation is shown in FIG. 11 as comprising a control module 1115 and a control logic modifier 1120, although in practice both modules may simply have the form of software in a single data processing unit. Control module 1115 receives data, representing the two or more images, transmitted from at least one of translation module 1105 and storage module 1110. Upon receipt of the data, control module 1115 generates a corresponding waveform. For example, control module 1115 may use a look-up table ("LUT") to determine a series of voltages to apply to a display. Such a LUT may be hard-coded into the control module 1115, or it may optionally be stored in the storage module 1100 or any other form of data storage.

Control module 1115 then transmits the generated waveform to control logic modifier 1120. Control logic modifier 1120 adjusts the waveform based on any one or more of the aforementioned parameters, for example, the temperature of the display module, the operating life of the display module, or characteristics of the display material. The adjusted waveform is then sent to a plurality of output means or terminals 1125.

Output terminals 1125 are typically in electrical communication with electrodes of the display module associated with the DMDD; this display module is not shown in FIG. 11 but may be a set of column electrodes of a typical active matrix display or direct drive display, such as will be well known to those skilled in the technology of electro-optic displays; representative electrode arrangements are illustrated in several of the aforementioned E Ink and MIT patents and applications. This invention does not exclude the possibility that additional circuitry (for example latching circuits) might be interposed between the output terminals of the DMDD and the actual electrodes of the associated module. Output terminals 1125 may, for example, be capable of switching each output to one of −V, 0, +V, or alternatively may be capable of switching each output to a voltage selected from an array of choices over the range −V to +V. Alternatively, output terminals 1125 may be capable of switching each output voltage to voltages selected from any number of known output architectures. Typically, if the DMDD is to be used with a module of the aforementioned "direct drive" type, the number of output terminals 1125 is an integral multiple of the number of pixels used to represent a single character in the associated display cell module.

Figure 12:
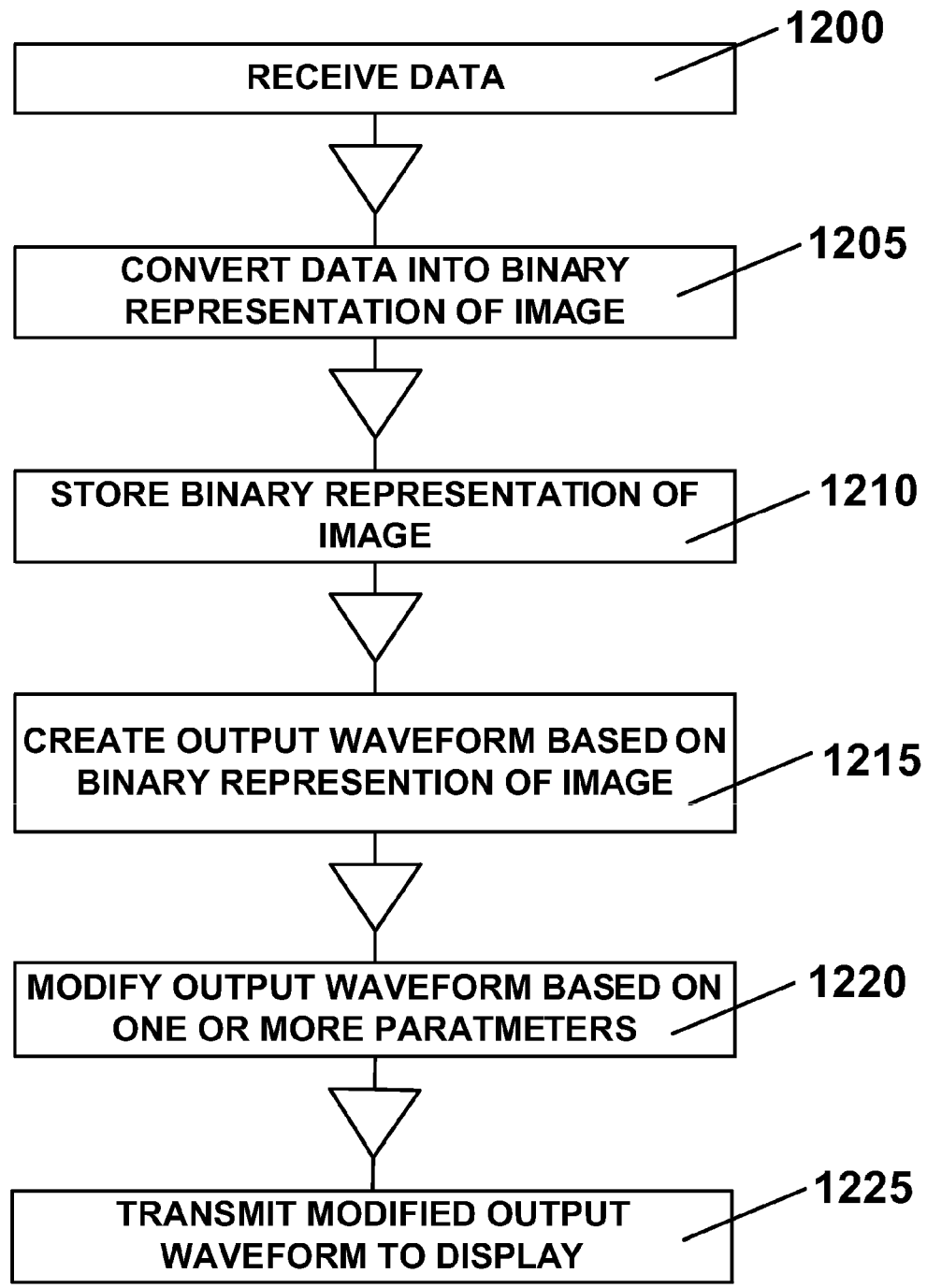
FIG. 12 is a flowchart illustrating the method of operation of the display module driver device shown in FIG. 11.

FIG. 12 is a flowchart illustrating the method of operation of the DMDD shown in FIG. 11, or a similar DMDD. First, data from a data source is received (Step 1200). The data received may be in a variety of formats, including for example, ASCII, Unicode, bitmap, RLE-compressed bitmap, or any format used to represent character or matrix data.

Next, the received data is converted into a binary representation of an image to be displayed (Step 1205). The received data is typically in a character or bitmap format and is usually converted into a pixel-wise binary representation. The data conversion may be performed by a variety of processes. For example it may be fixed by a backplane pattern, or it may be based on a built-in-font. Alternatively, the data conversion may be based upon a font that is stored in re-writeable or write-once memory storage, or embedded in the incoming data itself. For non-alphanumeric characters, the conversion process of Step 1205 is capable of interpreting a variety of compression routines to regenerate the original image.

Binary representations of images to be displayed are then stored (Step 1210). The storage medium is usually re-writeable memory, but it may also be write-once memory. From the foregoing description, it will be understood that, although receipt of data in Step 1200 and data conversion in Step 1205 is performed on data relating to one image at a time, storage Step 1210 is conducted so that data relating to at least two successive images (and possibly more) is available in the data storage means for use by the logic means. Next, an output signal waveform is created based on the binary representation of the two or more images (Step 1215). For example, a LUT may be used to determine a series of voltages to apply to a display.

The output signal waveform created in Step 1215 is then modified, based on one or more parameters (Step 1220). Such parameters may include, for example, the temperature of a display module, the operating life of a display module, or characteristics of a display material. This modified output signal waveform is then transmitted to a display (Step 1225). More specifically, the output signal waveform is transmitted to the addressing electrodes of the display module. Such a display module may be any type of display, including a liquid crystal display. However, as mentioned above, this invention is particularly, but not exclusively, intended for use useful with impulse driven electro-optic displays, which may be of any of the types described above.

The DMDD and DMDD assembly of the present invention provide several advantages. Firstly, they allow for character data to be passed to a large number of display modules at a relatively low bandwidth, which saves power and reduces the chance of data corruption. Secondly, they allow for the use of any of a number of low-voltage data interfaces, which may reduce the amount of electromagnetic interference coming from the display. Thirdly, some embodiments of this invention add a character interface to existing drivers, making them compatible with existing character display modules and potentially allowing displays to contain a heterogeneous mixture of electro-optic and other display technologies in the same sign, on a module-by-module basis. Finally, they allow tight integration between the controller functionality and the electro-optic material; each display module has, in effect, its own controller. This allows individual modules to be swapped out for different or newer modules, potentially with dramatically different electro-optic characteristics, without affecting the operation of the remaining modules of the display assembly.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense. For example, the displays etc. of the present invention may be used with any of the aforementioned types of electro-optic media. Electrophoretic media, especially encapsulated electrophoretic media, tend to be the preferred media, but numerous other types of imaging media may be used. When electrophoretic are used, they may contain any known components, for example as described in the aforementioned E Ink and MIT patents and applications.

The invention claimed is:

1. A flexible large area electro-optic display system comprising:
   a large area light-transmissive flexible substrate;
   a plurality of flexible electro-optic display units attached as tiles to the large area light-transmissive flexible substrate such that the flexible electro-optic display units are oriented for viewing through the large area light-transmissive substrate,
      wherein the flexible electro-optic display units each comprise a front transparent electrode and back pixel electrodes, a plurality of electrically charged particles disposed in a fluid and capable of moving through the fluid under the influence of an electric field, and a display module driver device; and
   a global input module operatively connected to the display module driver devices of the plurality of flexible electro-optic display units, wherein the global input module is configured to receive image data from an outside source and to distribute a portion of the image data to each of the display module driver devices.

2. The flexible large area electro-optic display system of claim 1, wherein each display module driver device comprises:
   input means for receiving data representing an initial and a final image to be displayed, wherein initial and final image data is not a pixel-wise representation of the initial and final images;
   translation means for translating the initial and final image data received by the input means into pixel-wise representations of the initial and final images;
   storage means for storing the pixel-wise representations of the initial and final images;
   a plurality of output means arranged to control voltages to be applied to the pixel electrodes of the flexible electro-optic display unit; and
   logic means arranged to receive data from the storage means and to generate from this data outputs for the plurality of output means.

3. A display module driver device according to claim 2 wherein the logic means is arranged to vary the outputs depending upon at least one of an environmental parameter, a parameter representative of the operating life of the display module, and a parameter representative of an electro-optic characteristic of the display module.

4. The flexible large area electro-optic display system of claim 1, further comprising a mask adjacent to the large area light-transmissive flexible substrate and effective to hide a non-active portion between the flexible electro-optic display units.

5. The flexible large area electro-optic display system of claim 1, further comprising a substantially clear adhesive layer between the large area light-transmissive flexible substrate and the flexible electro-optic display units.

6. The flexible large area electro-optic display system of claim 1, further comprising a protective film adjacent a side of the large area light-transmissive flexible substrate opposite of the flexible electro-optic display units.

\* \* \* \* \*